United States Patent [19]

Hagiwara et al.

[11] Patent Number: 5,105,918
[45] Date of Patent: Apr. 21, 1992

[54] DETECTION OF DAMPING FORCE FOR SHOCK ABSORBER CONTROL

[75] Inventors: Yasumasa Hagiwara; Toshinobu Ishida, both of Okazaki; Shigeru Kamiya, Aichi; Hideaki Sasaya, Okazaki; Yutaka Suzuki, Nishio, all of Japan

[73] Assignees: Nippondenso Co., Ltd., Kariya; Nippon Soken, Inc., Nishio, both of Japan

[21] Appl. No.: 424,854

[22] Filed: Oct. 23, 1989

[51] Int. Cl.$^5$ .................................. F16F 9/34
[52] U.S. Cl. .................................. 188/299; 188/319; 280/707
[58] Field of Search ............... 188/279, 297, 299, 319; 267/218, 64.28; 280/707

[56] References Cited

U.S. PATENT DOCUMENTS

| | | | |
|---|---|---|---|
| 3,321,210 | 5/1967 | Delchey . | |
| 4,729,459 | 3/1988 | Inagaki et al. | 188/299 |
| 4,892,328 | 1/1990 | Kurtzman et al. | 280/707 |
| 4,949,989 | 8/1990 | Kakizaki et al. | 188/299 X |
| 4,984,819 | 1/1991 | Kakizaki et al. | 188/299 X |

FOREIGN PATENT DOCUMENTS 60-23334  2/1985  Japan .
61-67009  5/1986  Japan .
62-29410  2/1987  Japan .

*Primary Examiner*—George A. Halvosa
*Attorney, Agent, or Firm*—Cushman, Darby & Cushman

[57] ABSTRACT

A damping force detecting apparatus for detecting a damping force of a variable damping force type shock absorber including a cylinder and a piston slidably inserted thereinto. The damping force detecting apparatus comprises a piezoelectric element assembly for generating a charge corresponding to a pressure applied thereto and a pressurizing device for pressurizing the piezoelectric element assembly. The piezoelectric element assembly has a diameter smaller than a cylindrical piston rod fixedly secured to the piston and is housed therein. The pressurizing device is screwed into the piston rod so as to be in contact relation to the piezoelectric element assembly for pressurizing the piezoelectric element assembly in correspondance with a distortion of the piston rod generated in the sliding directions of the piston with respect to the cylinder due to expanding and contracting action of the shock absorber.

1 Claim, 20 Drawing Sheets

FIG. 16
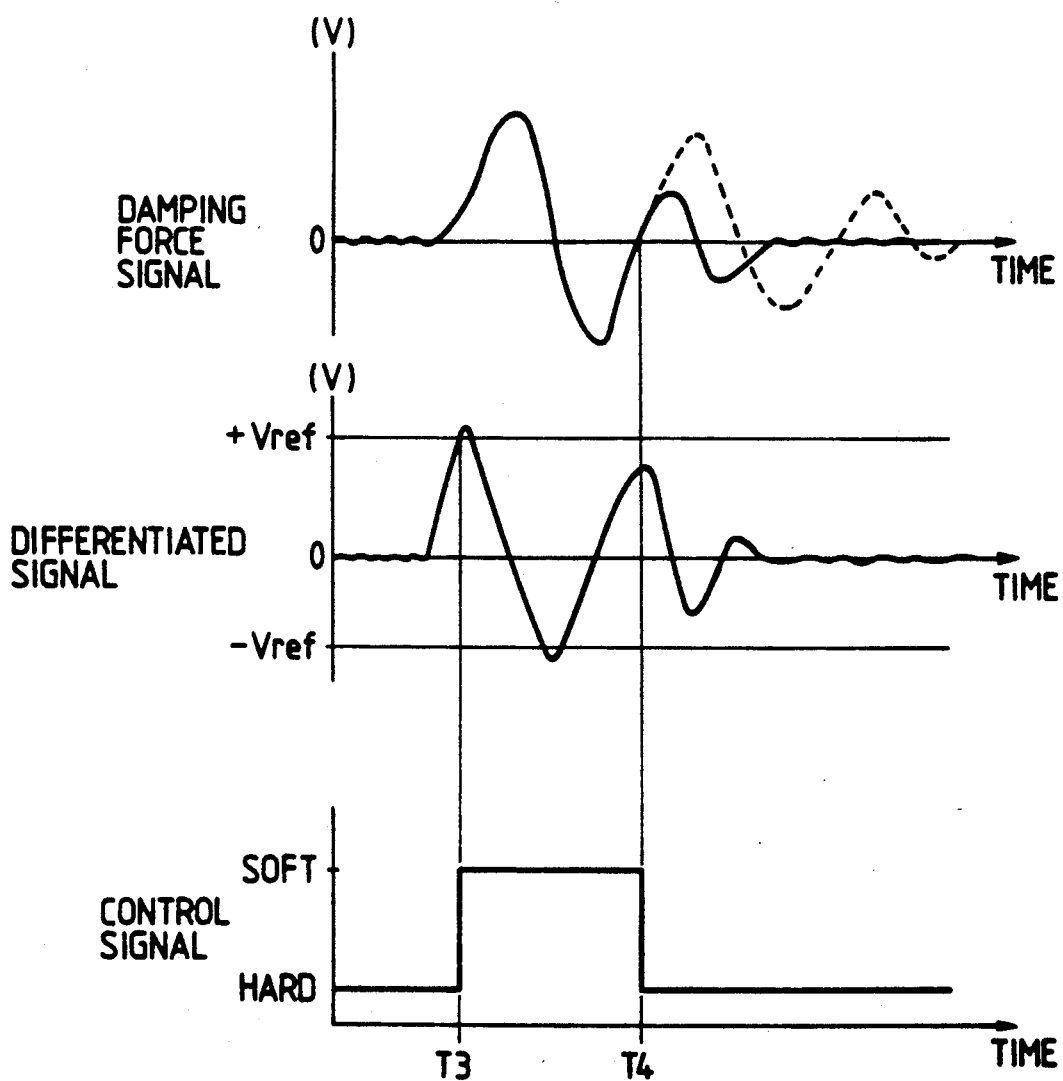
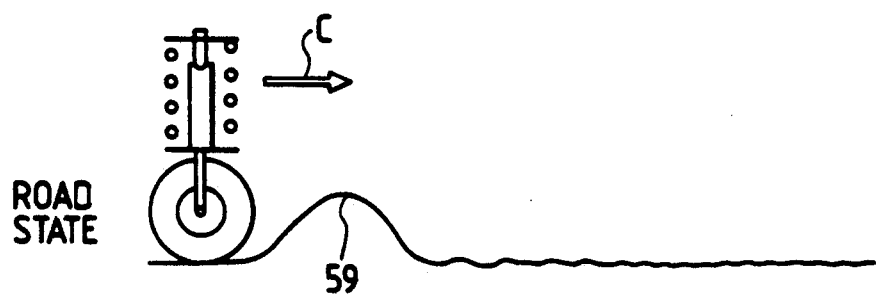

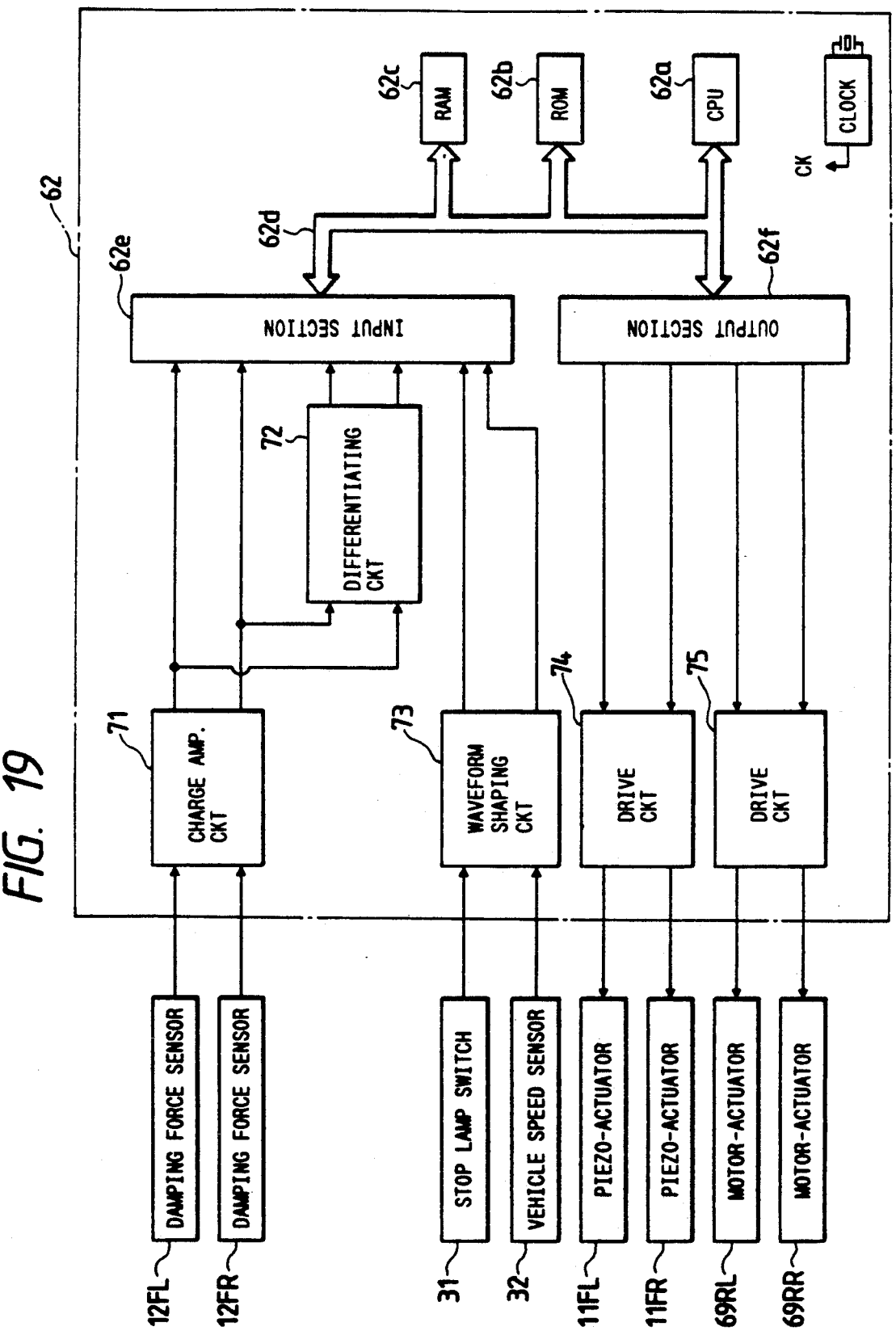

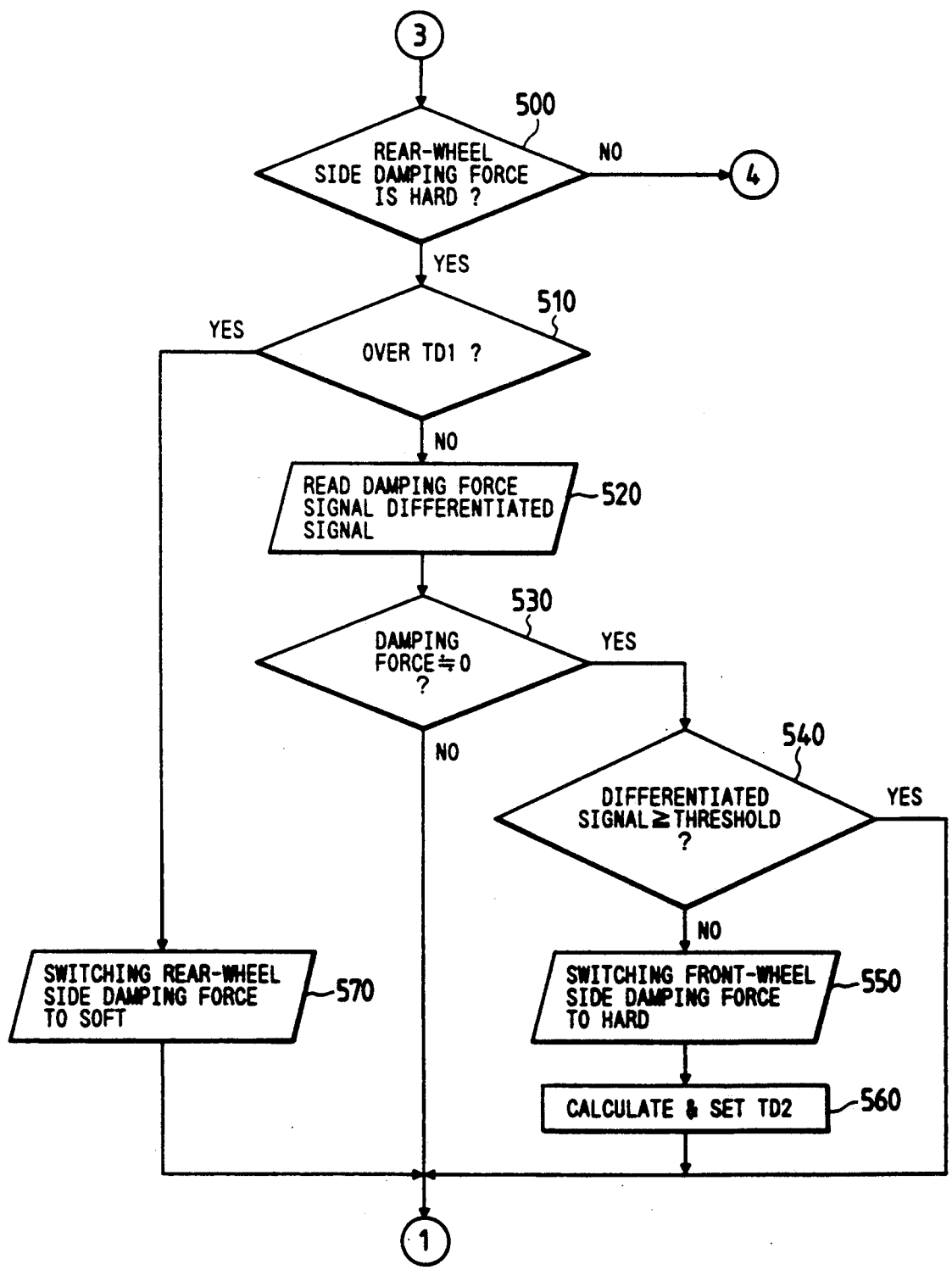

DETECTION OF DAMPING FORCE FOR SHOCK ABSORBER CONTROL

BACKGROUND OF THE INVENTION

The present invention relates generally to a shock absorber control apparatus for use in motor vehicles, for example, and more particularly to a damping force detector for detecting a damping force of a shock absorber to adequately control the shock absorber in accordance with the damping force detection result.

Preferably, motor vehicles are equipped with a variable damping force type shock absorber so as to take a countermeasure for rapid variation of the state of the vehicle running road, thereby stabilizing the motor vehicle to give a comfortable ride to passengers in the vehicle. The adequate control of the shock absorber is based upon quick and accurate detection of the damping force of the shock absorber.

Various types of shock absorber control apparatus have been devised heretofore. One known arrangement is disclosed in the Japanese Utility Model Provisional Publication No. 61-67009, the technique of which is made so as to detect the displacement of a variable damping force type shock absorber and change the damping force of the shock absorber in response to the variation speed of the displacement, taking a predetermined value. Another approach, such as is disclosed in the Japanese Patent Provisional Publication No. 62-29410, involves controlling the detection sensitivity of a damping force indicating signal generated from a damping force sensor of a variable damping force type shock absorber, in accordance with the setting state of the damping force of the shock absorber and adequately determining the damping force of the shock absorber in accordance with the road surface states and the vehicle running conditions.

However, such prior art techniques cannot produce satisfactory results for meeting requirements in terms of adequately controlling the shock absorber so as to stabilize the motor vehicle to give a comfortable ride to passengers. That is, because the variation speed of the displacement and the damping force of the shock absorber are actually in non-linear relation to each other, difficulty is encountered to detect the damping force on the basis of the displacement variation speed. In addition, the displacement detecting means is made up of a detection coil acting as a so-called differential transformer which is arranged to detect the variation of inductance due to expansion and contraction of the shock absorber, and the detection coil provides problems in terms of durability and reliability. Even if using an optical sensor or an ultrasonic sensor in place of the detection coil, the optical sensor and the ultrasonic sensor respectively have the inherent problems. Besides, in the case of changing the detection sensitivity of the output signal of the damping force sensor in accordance with the setting state of the damping force, there is a problem that the circuit arrangment becomes complex. Further, in changing the detection sensitivity of the output signal of the damping force sensor, the changing timing is adequately determined, and the inadequate changing timing causes vibration of the motor vehicle.

SUMMARY OF THE INVENTION

It is therefore an object of the present invention to provide a damping force detector which is capable of accurately detecting the damping force of a shock absorber and which is independent of humidity and contamination and further bending of a piston rod of the shock absorber.

One feature of the present invention is that the damping force detector comprises a piezoelectric device provided in a piston rod connected to a piston making up a shock absorber in cooperation with a cylinder and a pressurizing device arranged to transmit to the piezoelectric device a distortion generated in the piston rod along the sliding directions of the piston with respect to the cylinder. The function of piezoelectric device is to generate an electric charge corresponding to the distortion transmitted from the external, that is, has the piezoelectric effect to develop a voltage between surfaces of its crystal. The piezoelectric device is made of zirconate titanate, barium titanate, rock crystal, Rochelle salt, or others.

The pressurizing device is screwed into the piston rod so as to be in contact with relation to the piezoelectric device for pressurizing the piezoelectric device in correspondance with a distortion of the piston rod generated in the sliding directions of the piston with respect to the cylinder due to expanding and contracting action of the shock absorber. Preferably, the pressurizing device comprises a convex member having at its one end portion a convex surface and a concave member having at its one end portion a concave surface, and the convex and concave members are coupled to each other so that the convex surface and concave surface thereof are in contact with each other. More preferably, an elastic member is disposed between the piezoelectric device and the pressurizing device so that the pressurizing device pressurizes the piezoelectric device through the elastic member.

BRIEF DESCRIPTION OF THE DRAWINGS

The object and features of the present invention will become more readily apparent from the following detailed description of the preferred embodiments taken in conjunction with the accompanying drawings in which:

FIG. 16 is a timing chart for describing the control executed by the FIG. 13 electronic control unit;

FIG. 19 is a block diagram showing an electronic control unit used in the embodiment, of this invention; and FIGS. 20A, 20B, 20C and 20D are flow charts for describing a shock absorber control process executed by the FIG. 19 electronic control unit.

DETAILED DESCRIPTION OF THE INVENTION

Figure 1:
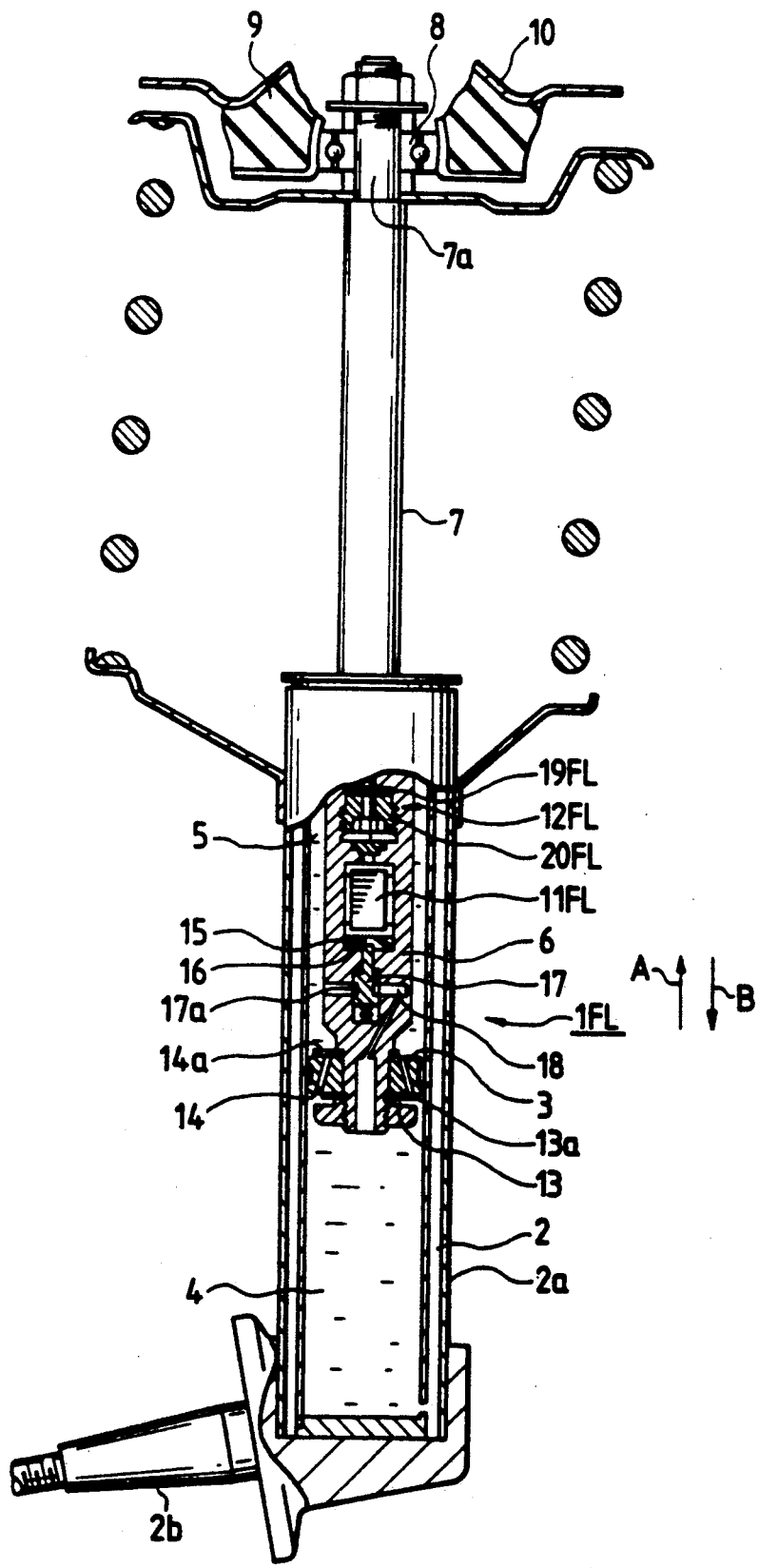
FIG. 1 is a partial cross sectional view showing a variable damping force type shock absorber which includes a damping force sensor according to an embodiment of the present invention.

Referring now to FIG. 1, there is illustrated a variable damping force type shock absorber which includes a damping force sensor according to an embodiment of the present invention. In FIG. 1, the variable damping force type shock absorber illustrated at 1FL comprises a cylinder 2 and a main piston 3 which is inserted or fitted into the cylinder 2 so as to be slidable along the axis directions indicated by arrows A and B. The main piston 3 divides the inside of the cylinder into a first hydraulic pressure chamber 4 and a second hydraulic pressure chamber 5. The main piston 3 is connected to one end of a piston rod 6 and the other end of the piston rod 6 is fixedly secured to a shaft 7. The upper portion 7a of the shaft 7 is secured through a bearing 8 and a vibration proofing rubber 9 to a portion of the body of the motor vehicle. The cylinder 2 is housed in an outer shell 2a of the shock absorber 1FL, the lower portion of which is fixedly secured to a lower arm 2b of the motor vehicle.

Figure 2:
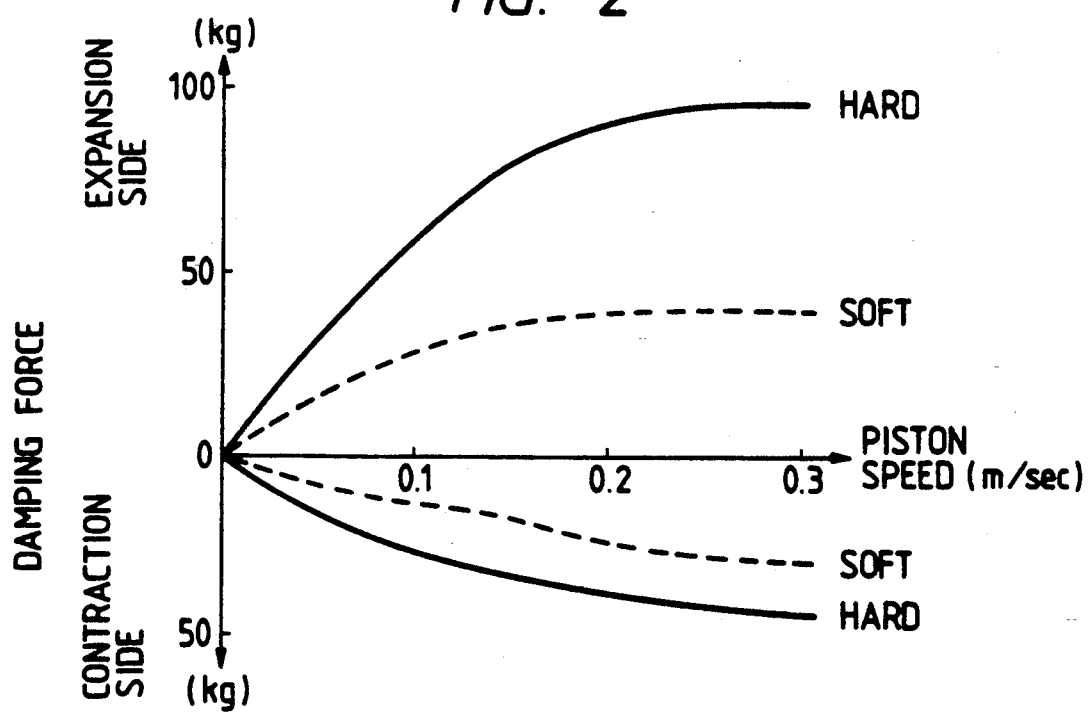
FIG. 2 is an illustration of a damping force characteristic of the FIG. 1 shock absorber.

In the piston rod 6, there are provided a piezo-actuator 11FL for changing over the damping force of the shock absorber 1FL and a piezo-type damping force sensor 12 FL. On the other hand, in the main piston 3 there are formed an expansion-side fixed orifice 13 and a contraction-side fixed orifice 14 whereby the first and second hydraulic pressure chambers 4 and 5 are communicated with each other. At the outlet sides of the expansion-side fixed orifice 13 and contraction-side fixed orifice 14 are disposed plate valves 13a and 14a, respectively, each of which restricts the flow to a predetermined direction. Thus, when the main piston 3 slides within the cylinder 2 along the axis directions indicated by the arrows A and B, the operation oil in the first and second hydraulic pressure chambers 4 and 5 are communicated with each other through the expansion-side fixed orifice 13 and the contraction-side fixed orifice 14, and since the cross-sections of the flow passages of the operation oil are relatively small, the flow rate results in being small. Accordingly, in the case of closing a sub-passage 18, the shock absorber 1FL shows a high damping force (HARD) characteristic as illustrated in FIG. 2.

The piston rod 6 has therein a space hollowed in its axis directions and the piezo-actuator 11FL, constructed by an electrostriction element laminated member made of a piezoelectric ceramic such as zirconate titanate (PZT), encased in the space of the piston rod 6. Normally, the piezo-actuator 11FL is biased by means of a leaf spring 15 in the direction indicated by the arrow A. The lower end surface of the piezo-actuator 11FL faces a spool valve 17 with an oiltight chamber 16 being interposed therebetween. The spool valve 17 is slidable in the space of the piston rod 6 in the directions of its axis. In response to application of a predetermined high-voltage to the piezo-actuator 11FL, the spool valve 17 moves by a predetermined distance in the direction indicated by the arrow B in FIG. 1. On the other hand, in response to discharge of the predetermined high-voltage applied thereto, the piezo-actuator 11FL is moved in the direction of the arrow A by means of the biasing force of the leaf spring 15, thereby moving the spool valve 17 in the same direction..

In the circumference of a lower portion of the spool valve 17 is formed an annular channel 17a, an upper portion of the annular channel 17a having a cylindrical configuration. Thus, when the spool valve 17 moves in the direction of the arrow A due to contraction of the piezo-actuator 11FL, the sub-passage 18 formed in the piston rod 6 allows communication between the first and second hydraulic pressure chambers 4 and 5 through the annular channel 17a made in the circumference of the lower portion of the spool valve 17. Since the first and second hydraulic pressure chambers 4 and 5 are communicated with each other through the sub-passage 18, the cross section of the flow passage for the operation oil which flows through the main piston 3 becomes relatively large to increase the flow rate thereof Therefore, the shock absorber 1FL results in taking a low damping force (SOFT) characteristic as shown in FIG. 2.

On the other hand, due to the application of the high voltage, the piezo-actuator 11FL expands by a small amount and the spool valve 17 moves downward by a predetermined distance in the direction of the arrow B whereby the sub-passage is shut off by means of the cylindrical portion of the spool valve 17. Thus, since the shutting-off of the sub-passage 18 causes cutting off of the communication between the first and second hydraulic pressure chambers 4 and 5, the cross section of the flow passage for the operation oil which flows through the main piston 3 becomes relatively small to decrease the flow-rate thereof. Accordingly, the shock absorber 1FL results in assuming the high damping force (HARD) characteristic as shown in FIG. 2.

Here, the piezo-type damping force sensor 12FL is disposed at an upper portion of the piston rod 6 so as to detect the magnitude of the damping force applied to the shock absorber 1FL. The piezo-type damping force sensor 12FL is constructed by coupling a piezoelectric device 19FL to the piston rod 6 through a pressurizing member 20FL.

Figure 3:
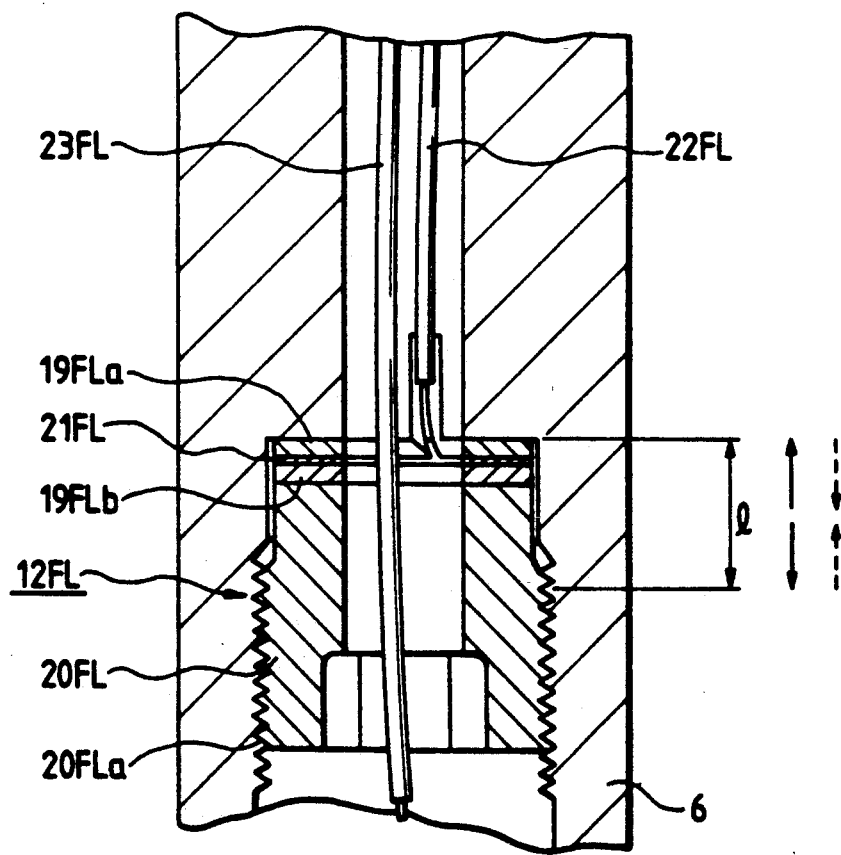
FIG. 3 is a cross-sectional view illustrating a structure of the damping force sensor according to the embodiment of the present invention.

Secondly, the structure of the piezo-type damping force sensor 12FL will be described hereinbelow with reference to FIGS. 3 and 4. As illustrated in FIG. 3, the piezo-type damping force sensor 12FL comprises two thin plates 19FLa and 19FLb each of which is a disc-like piezoelectric device made of a piezoelectric ceramics such as PZT and each of which has a through-hole at a center portion thereof. The two plates 19FLa and 19FLb sandwich a thin plate 21FL which is a disc-like positive electrode and which has a through-hole at its center portion. Also included in the piezo-type damping force sensor 12FL is the pressurizing member 20FL which has a cylindrical configuration and which has a through-hole formed at its center portion along its own axis. The pressurizing member 20FL is at its circumference provided with a threaded portion 20FLa to be screwed into the piston rod 6, whereby the piezo-type damping force sensor 12FL is coupled to the piston rod which acts as a negative electrode. The detection signal of the piezo-type damping force sensor 12FL is led to the external through a lead wire 22FL disposed in a passage formed in the piston rod 6. Illustrated at 23FL is another lead wire for application of the high voltage to the piezo-actuator 11FL.

A portion of the force developed in correspondance with the axial distortion (strain) of the piston rod 6 due to the damping force of the shock absorber 1FL is transmitted from the pressurizing member 20FL through the threaded portion 20FLa to the piezoelectric devices 19FLa and 19FLb. In this embodiment, even in the case of no generation of the distortion in the axis direction of the piston rod 6, the piezoelectric devices 19FLa and 19FLb are subjected to a predetermined initial stress by the tightening or screwing of the pressurizing member 20FL with respect to the piston rod 6. This is for the purpose of arranging the piezo-type damping force sensor 12FL such that, in the case of generation of a distortion due to axial tension (in the directions indicated by solid-line arrows in FIG. 3) of the piston rod 6 or generation of a distortion due to axial compression (in the directions indicated by dotted-line arrows in the same figure) of the piston rod 6, the generated distortion can be detected as variation with respect to the distortion resulting from the initial stress. Here, the stress $\sigma$ applied to the piezoelectric devices 19FLa and 19FLb can be expressed by the following equation.

$$\sigma = P/\{(A1/K) + A2\} \quad (1)$$

where P represents the load applied in the directions of the axis of the piston rod 6, A1 designates the cross section of the portion of the piston rod 6 in which the piezo-type damping force sensor 12FL is housed, A2 denotes the cross section of the pressurizing member 20FL, and K can be obtained in accordance with the equation:

$$K = a - \{(a \times b)/(l+b)\} \quad (2)$$

$$a = E2/E1 \quad (3)$$

$$b = \{E2/(EP-1)\} \times 1P \quad (4)$$

where l represents the length of the pressurizing portion of the pressurizing member 20FL as indicated in FIG. 3, E1 designates the elastic modulus of the piston rod 6, E2 depicts the elastic modulus of the pressurizing member 20FL, EP denotes the elastic modulus of the piezoelectric devices 19FLa, 19FLb, and 1P is the thickness of the piezoelectric devices 19FLa, 19FLb.

In accordance with the aforementioned equations (1) to (4), an appropriate length l of the pressurizing portion is calculated to determine the sensitivity of the piezoelectric devices 19FLa, 19FLb with respect to the axial application force of the piston rod 6. Generally, the sensitivity is heightened in accordance with an increase in the length l thereof, and because of actual limitation imposed upon dimension, in this embodiment, the value K is set to be about 0.5.

Figure 4:
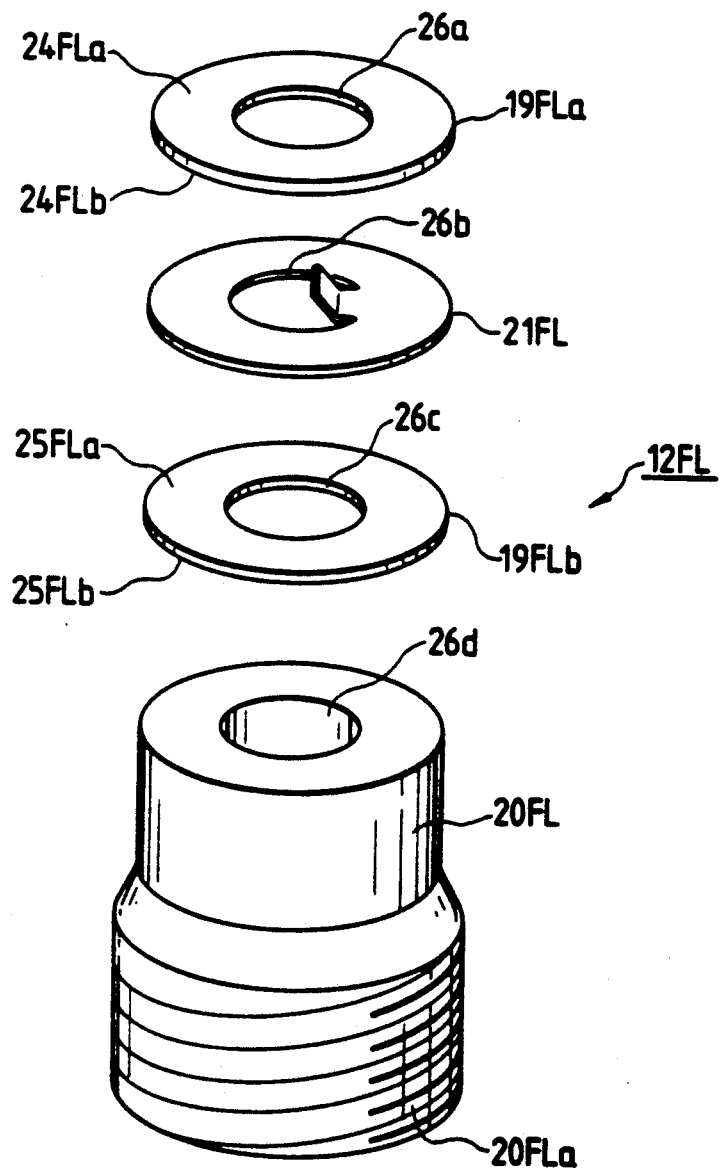
FIG. 4 is an exploded view showing the damping force sensor according to the embodiment of this invention.

FIG. 4 is an exploded view showing the piezo-type damping force sensor 12FL. As shown in FIG. 4, silver paste or the like is applied as an electrode material on the front and rear surfaces 24FLa, 24FLb of the piezoelectric device 19FLa and further on the front and rear surfaces 25FLa, 25FLb of the piezoelectric device 19FLb. The output signals of the piezoelectric devices 19FLa and 19FLb are outputted from the positive electrode through the lead wire 22FL to the external. The piezoelectric devices 19FLa, 19FLb, the positive electrode 21FL and the pressurizing member 20FL respectively have through-holes 26a, 26b, 216c and 26d for introduction of the lead wire 23FL illustrated in FIG. 3.

As described above, according to this embodiment, since the distortion generated in correspondance with the damping force can directly be measured only with the piezo-type damping force sensor being encased in the piston rod of the variable damping force type shock absorber, the detection of damping force can be effected accurately and quickly with a simple structure and a high response. In addition, since the piezo-type damping force sensor is housed in the piston rod thereof, the sensor is not subjected to contamination and damage so as to improve the reliability and durability. Further, the piezo-type damping force sensor is small in size and light in weight, thereby enlarging the range of application.

Figure 6:
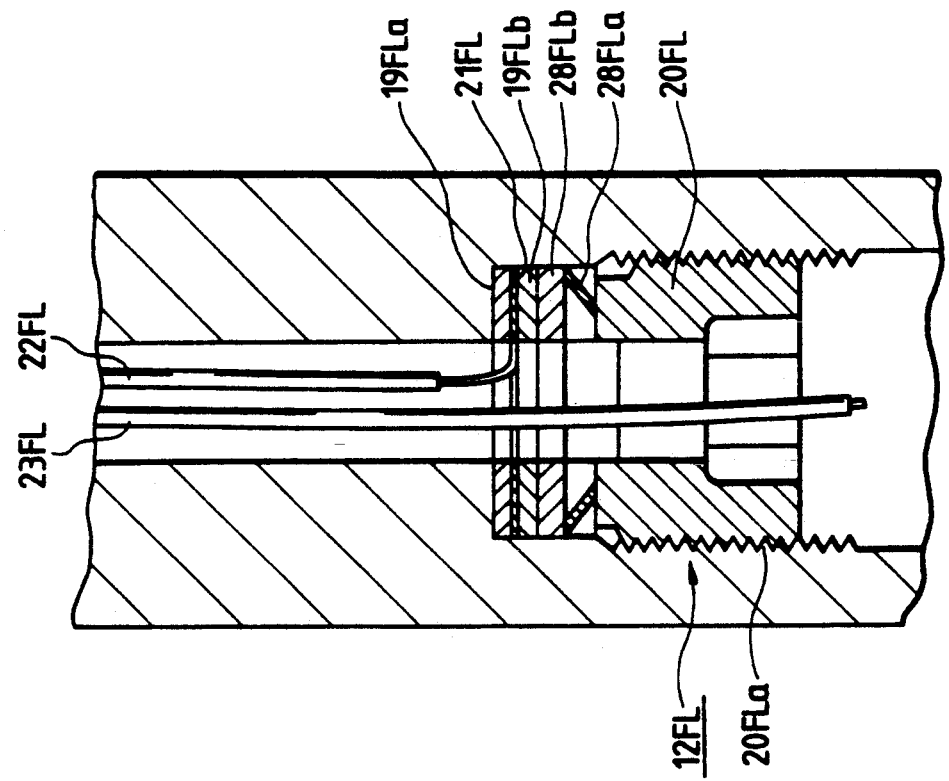
FIG. 6 is a cross-sectional view showing a further arrangement of the damping force sensor of this embodiment.
Figure 5:
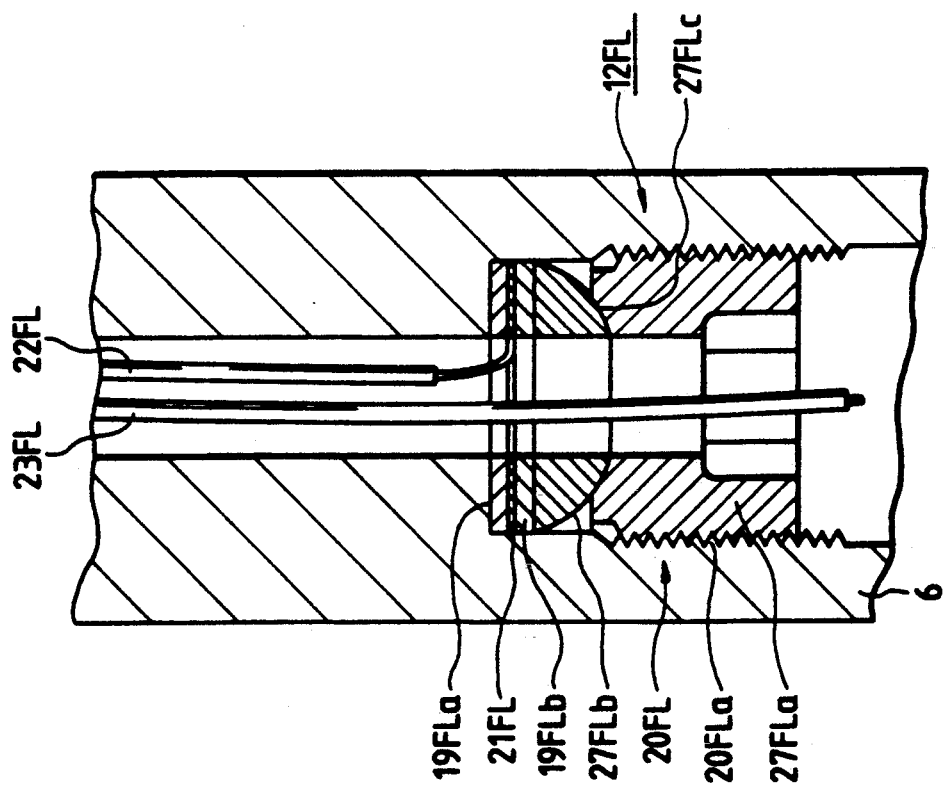
FIG. 5 is a cross-sectional view showing another arrangement the damping force sensor of this embodiment.

Here, it is also appropriate that, as illustrated in FIG. 5, the pressurizing member 20FL is made up of a pressurizing portion 27FLa and a pressure transmitting portion 27FLb which are arranged to be in spherical contact with each other. In this case, irrespective of application of a bending moment to the piston rode, it is possible to accurately detect the damping force, because the bending moment is not transmitted to the piezoelectric devices 19FLa and 19FLb due to slippage between the pressurizing portion 27FLa and the pressure transmitting portion 27FLb occurring at the spherical contact portion 27FLc. Further, it is also appropriate that, as illustrated in FIG. 6, a disc spring, or belleville spring, 28FLa and a disc spring washer 28FLb are interposed between the pressurizing member 20FL and the piezoelectric device 19FLb. This arrangement offers the fact that the axial distortion transmitted from the pressurizing member 20FL to the piezoelectric device 19FLb is corrected to be uniform by means of the elasticity of the disc spring 28FLa. Thus, high machining accuracy for the contact surfaces of the pressurizing member 20FL and the piezoelectric device 19FLb is not required so as to make the manufacturing and assembling thereof easier.

Although in this embodiment the piezoelectric devices are made of PZT, it is allowed to make them by using barium titanate, rock crystal or others which have the piezoelectric effect. Further, the piezoelectric device is not limited to the disc-like thin plate.

Figure 7:
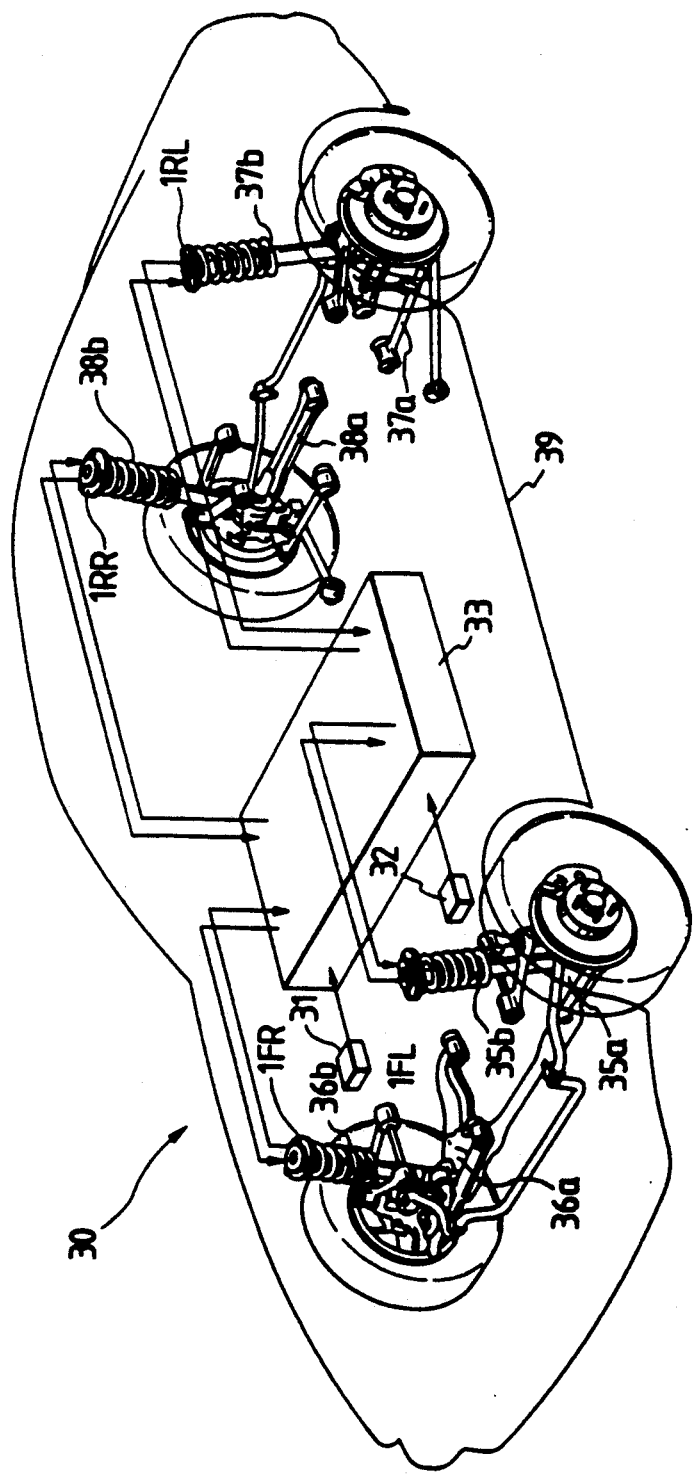
FIG. 7 an arrangement of a shock absorber control system according to this invention.

A description will be made hereinbelow in terms of a shock absorber control apparatus for use in a motor vehicle. FIG. 7 shows a system arrangement of the shock absorber control apparatus. In FIG. 7, the shock absorber control apparatus, illustrated at numeral 30, comprises variable damping force type shock absorbers 1FL, 1FR, 1RL, 1RR, a stop lamp switch 31 for detecting the state of the braking operation of the motor vehicle, a vehicle speed sensor 32 for detecting the speed of the motor vehicle, and an electronic control unit (ECU) 33. As described above, each of the variable damping force type shock absorbers 1FL, 1FR, 1RL, 1RR has therein a piezo-type damping force sensor for sensing the damping force applied thereto and a piezo-actuator for changing the damping force thereof. The shock absorbers 1FL, 1FR, 1RL, 1RR, together with coil springs 35b, 36b, 37b, 38b, are prespectively disposed between the vehicle body 39 and suspension lower arms 35a, 36a, 37a, 38a. The detection signals of the respective sensors and the switch are inputted to the ECU 33 which in turn outputs control signals to the respective piezo-actuators. The description of the variable damping force shock absorbers 1FL, 1FR, 1RL, 1RR will be omitted because they have the same structure as described above.

Figure 8:
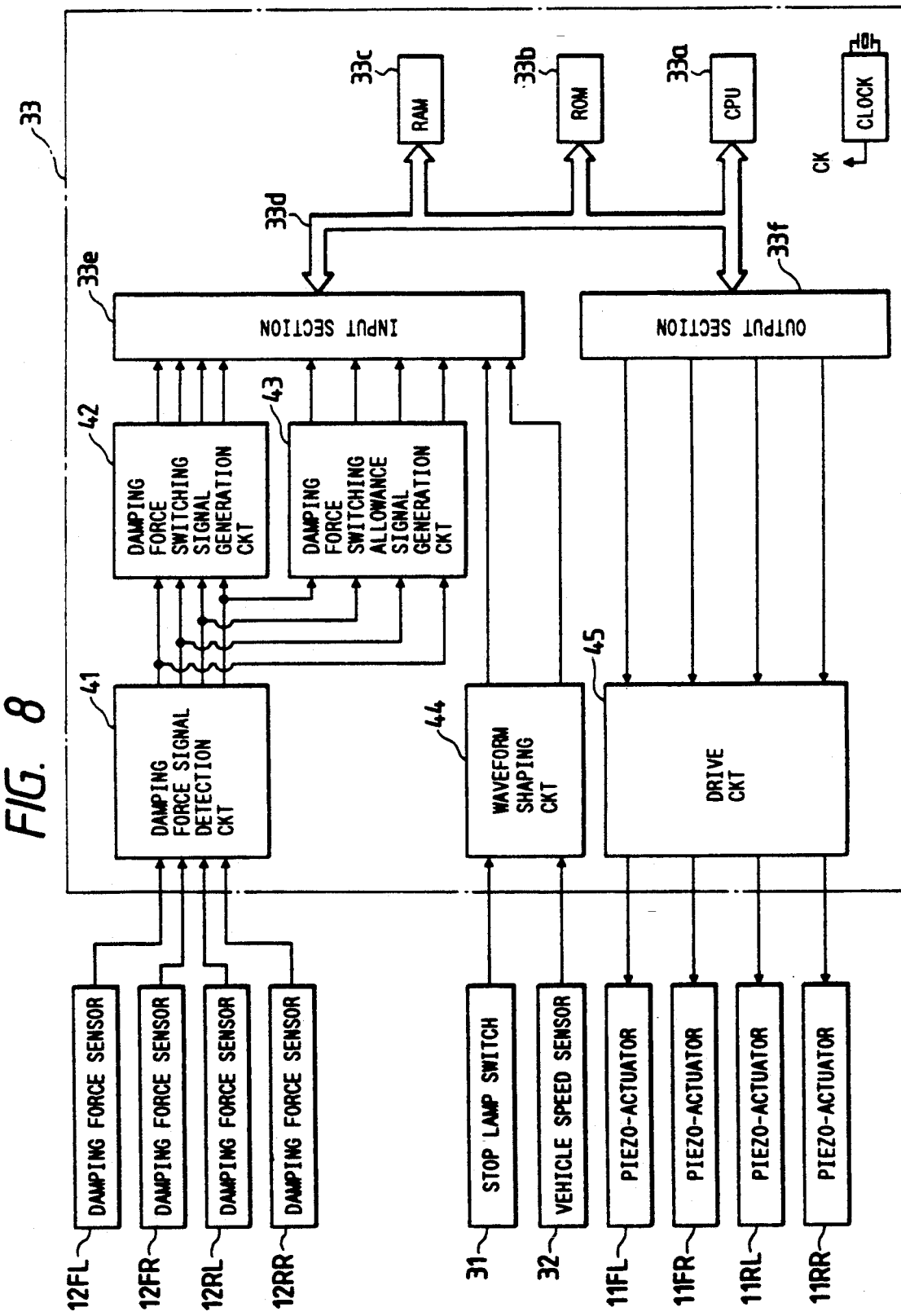
FIG. 8 a block diagram showing an arrangement of an electronic control unit used in the FIG. 7 shock absorber control system.

Secondly, the ECU 33 will be described hereinbelow with reference to FIG. 8. In FIG. 8, the ECU 33 is constructed as a logical operation circuit basically comprising a central processing unit (CPU) 33a, a read-only memory (ROM) 33b and a random access memory (RAM) 33c. The CPU 33a is coupled through a common bus 33d to an input section 33e and an output section 33f which are in turn coupled to the external devices. The output signals of the piezo-type damping force sensors 12FL, 12FR, 12RL and 12RR are inputted to a damping force signal detection circuit 41, the output signals of which are supplied through a damping force switching signal generation circuit 42 or a damping force switching allowance signal generation circuit 43 to the input section 33e and then to the CPU 33a. Further, the detection signals of the stop lamp switch 31 and the vehicle speed sensor 32 are supplied through a waveform shaping circuit 44 and the input section 33e to the CPU 33a. On the other hand, the CPU 33a outputs control signals through the output section 33f and a drive circuit 45 to piezo-actuators 11FL, 11FR, 11RL and 11RR. Here, the damping force signal detection circuit 41 inputs the output signals (electric charge) of the piezo-type damping force sensors 12FL, 12FR, 12RL and 12RR which correspond to the magnitudes of the damping forces so as to output damping force signals. The damping force switching signal generation circuit 42 receives the damping force signals therefrom. The damping force switching signal generation circuit 42 is provided with a differentiating circuit for outputting the variation of the damping force signal and a comparing circuit for checking whether the variation is between the upper limit and the lower limit to output one of the damping force switching signals indicative of the high damping force (high level) and the low damping force (high level). Further, the damping force switching allowance signal generation circuit 43 comprises a comparing circuit and logical circuits to output, on the basis of the damping force signal, a damping force switching allowance signal (high level) at one of the timings that the damping force becomes zero, the damping force assumes zero during variation from the expansion of the shock absorber and to the contraction thereof and the damping force is taken to be zero when the shock absorber is at the contraction side position, and output a damping force switching inhibition signal at the other timings.

Figure 9:
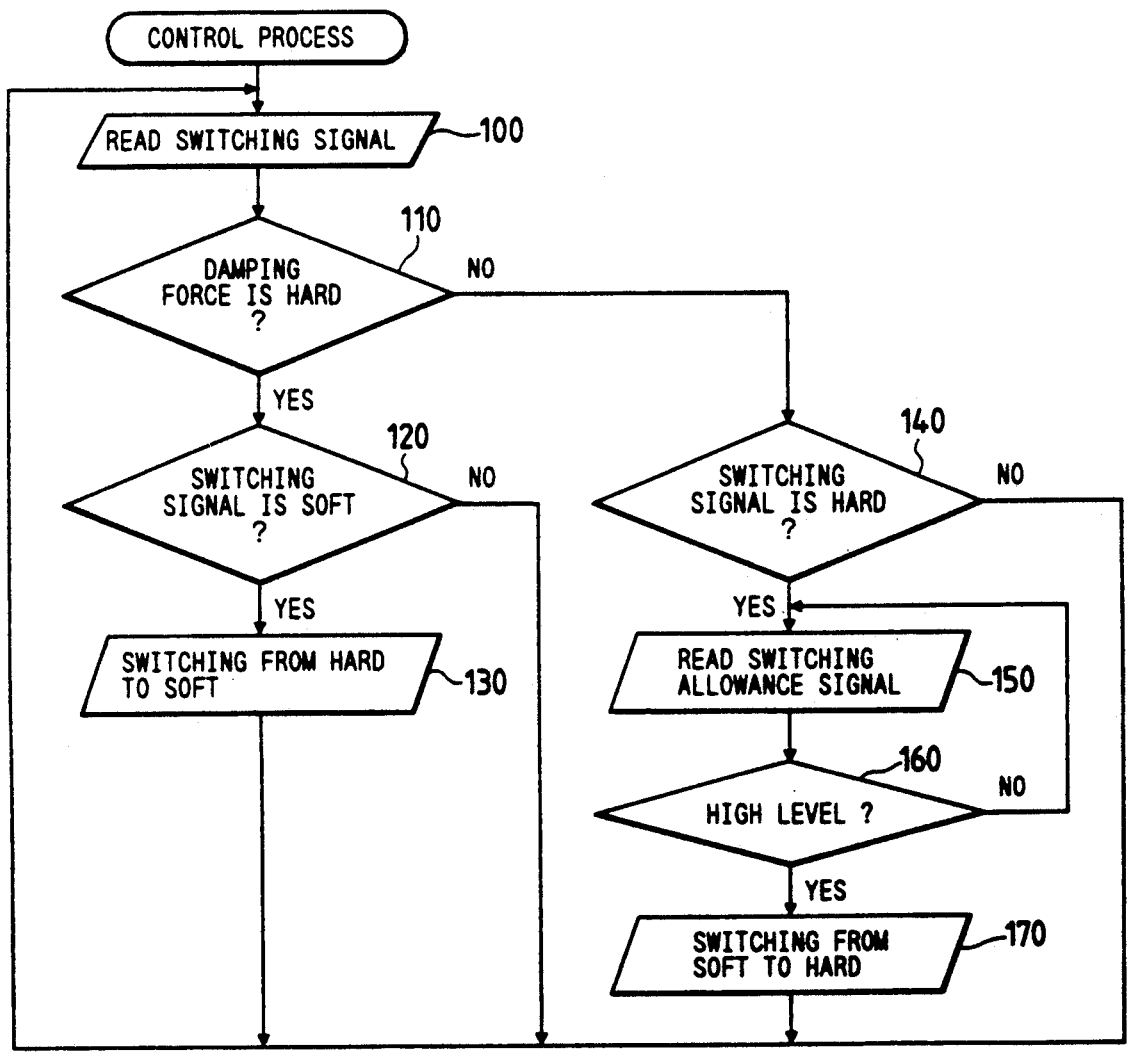
FIG 9 is a flow chart showing a shock absorber control process to be executed by the FIG. 8 electronic control unit.

The shock absorber control precess executed by the ECU 33 will be described hereinbelow with reference to the flow charts of FIG. 9. This process may be performed in response to the start of the ECU 33.

Control starts with a step 100 to read a damping force switching signal, followed by a step 110 to check whether the present damping force is the high damping force (HARD). If the answer of the step 110 is affirmative, control goes to a step 120, and if the answer is negative, control goes to a step 140. In the step 120, it is checked whether the damping force switching signal read in the step 100 indicates the low damping force (SOFT). If so, the step 120 is followed by a step 130, and if not, the operational flow returns to the step 100. The step 130 supplies the piezo-actuators 11FL, 11FR, 11RL and 11RR with control signals for switching the damping force from the high damping force (HARD) to the low damping force (SOFT). After execution of the step 130, the operational flow returns to the step 100.

On the other hand, in the step 140 executed when the decison in the step 110 is "NO", it is checked whether the damping force switching signal read in the step 100 is for the high damping force (HARD). If the answer of the step 140 is "YES", control goes to a step 150. If the answer is "NO", the step 140 is followed by the step 100. The step 150 is provided in order to read the damping force switching allowance signal, then followed by a step 160 to check whether the damping force switching allowance signal read in the previous step 150 allows the switching of the damping force (i.e., high level). If the answer of the step 160 is affirmative, control goes to a step 170, and if not, the operational flow returns to the step 150. In the step 170 is executed a process in which control signals for switching of the damping force from the low damping force (SOFT) to the high damping force (HARD) are supplied to the piezo-actuators 11FL, 11FR, 11RL and 11RR. After execution of the step 170, the operational flow returns to the step 100. Thereafter, the shock absorber control process is repeadedly effected between the steps 100 and 170.

Figure 10:
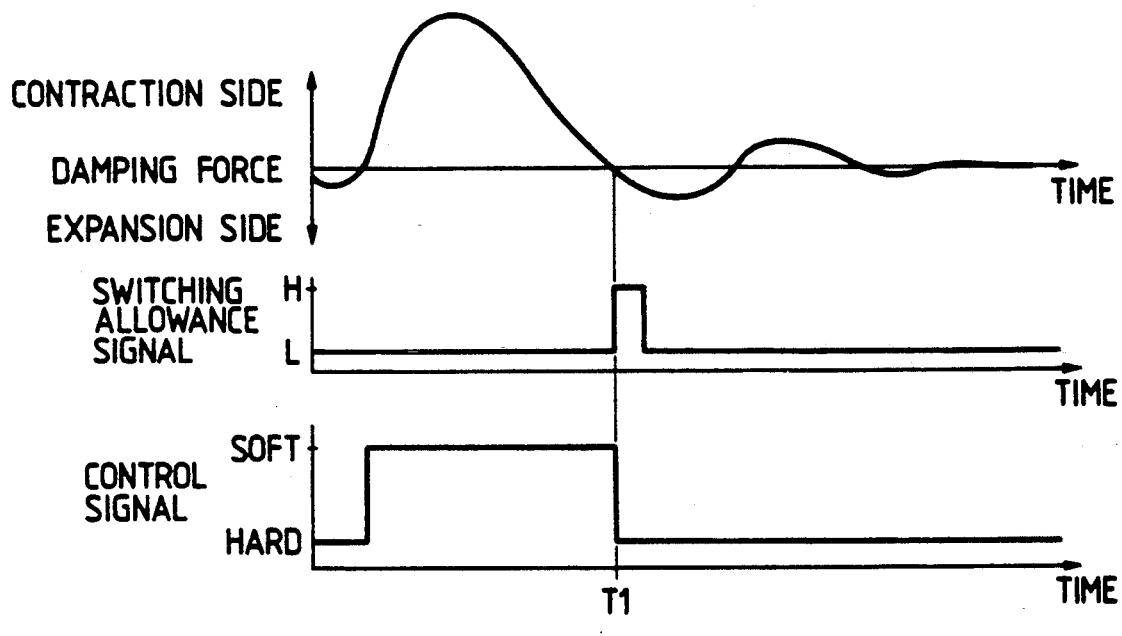
FIGS. 10 and 11 are timing charts for describing the control executed by the FIG. 8 electronic control unit.

As described above, according to this shock absorber control process, since in the switching of the damping force the damping force is switchable from the low damping force (SOFT) to the high damping force (HARD) under the condition that the switching is allowed by the damping force switching allowance signal (high level), the damping force switching can be effected at an appropriate timing. That is, as shown in the timing chart of FIG. 10, the damping force switching allowance signal is changed to the high level (H) at the time T1 that the damping force signal becomes zero, and a control signal is outputted so that the damping force is changed from the low damping force (SOFT) to the high damping force (HIGH). Thus, since, on the basis of the detection result of the piezo-type damping force sensor, the damping force is changed from the low damping force to the high damping force at the timing that the damping force of the shock absorber becomes zero, it is possible to prevent vibration due to the damping force switching operation. This results in improving the comfortable ride of the motor vehicle and further heightening the controllability and stability of the motor vehicle. In addition, the appropriate selection of the damping force switching timing causes the accuracy of the damping force switching control.

Figure 11:
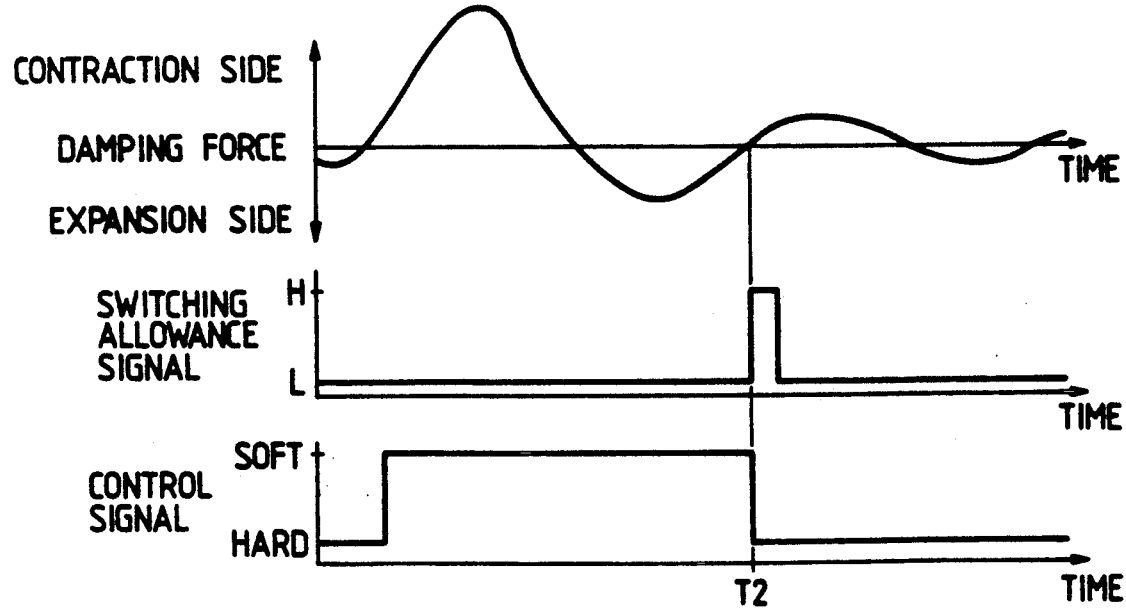
Figure 12:
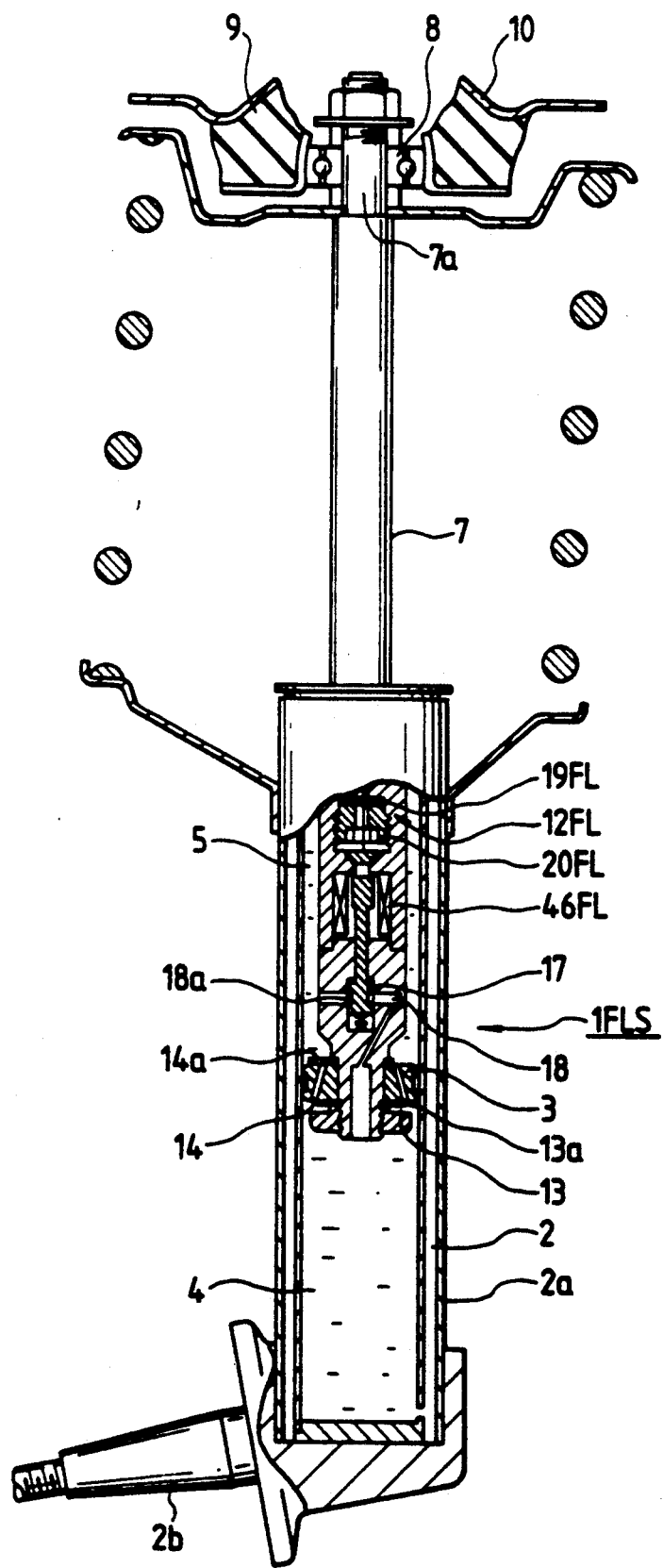
FIG. 12 is a partial cross-sectional view showing a structure of another variable damping force shock absorber.

Here, it is also appropriate to arrange the damping force switching allowance signal generation circuit such that, as illustrated in FIG. 11, during variation from the expansion to the contraction, the damping force switching allowance signal is switched to the high level (H) at the time T2 that the damping force signal becomes zero and a control signal is outputted for switching from the low damping force (SOFT) to the high damping force (HARD). In this case, the determination of the damping force switching timing from the low damping force to the high damping force becomes adequate, thereby effectively preventing rapid increase in the damping force due to the damping force switching. Further, although the changing of the damping force of the shock absorber is made by means of the piezo-actuator, the same effect can be obtained by using a variable damping force type shock absorber 1FLS having therein an electromagnetic solenoid type actuator 46FL as shown in FIG. 12.

A description will be made hereinbelow in terms of a second embodiment of a shock absorber control system according to the present invention with reference to FIGS. 13 through 16. Parts corresponding to those in the drawings showing the first embodiment of the shock absorber control system will be marked with the same numerals and characters and the description thereof will be omitted for brevity.

Figure 13:
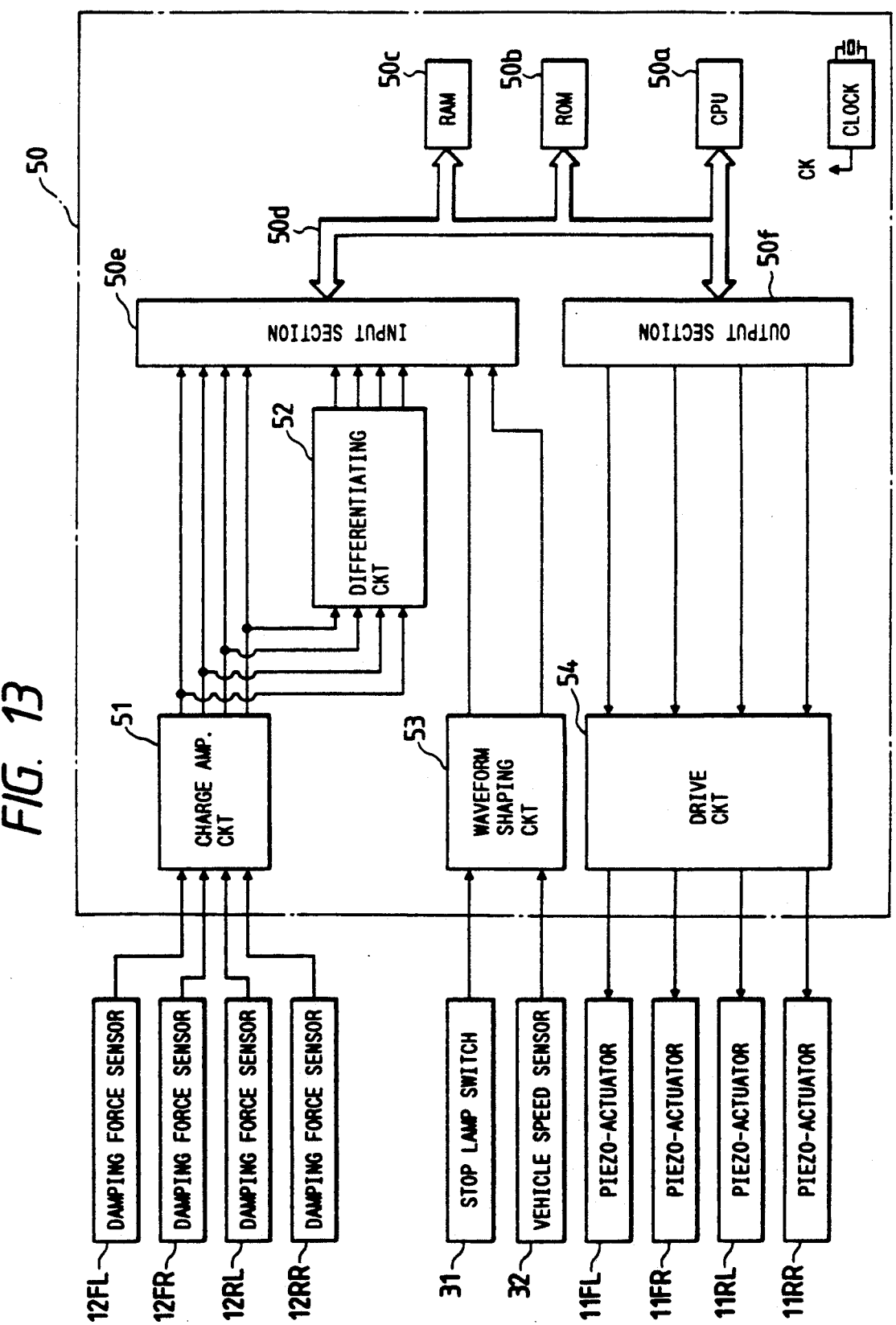
FIG. 13 is an arrangement of an electronic control unit used in a shock absorber control system according to another embodiment of this invention.

FIG. 13 is an illustration of the arrangement of an electronic control unit (ECU) 50 employed for the second embodiment of the shock absorber control system. In FIG. 13, the ECU 50 is constructed as a logical operation circuit basically comprising a central processing unit (CPU) 50a, a read-only memory (ROM) 50b and a random access memory (RAM) 50c. These units are coupled through a common bus 50d to an input section 50e and an output section 50f. The detection signals of piezo-type damping force sensors 12FL, 12FR, 12RL and 12RR are supplied to a charge amplifying circuit 51, the output signals of which are directly supplied to the input section 50e and further supplied to a differentiating circuit 52 so as to produce differentiated signals which are in turn fed to the input section 50e. The detection signals of a stop lamp switch 31 and a vehicle speed sensor 32 are supplied to the input section 50e after passed through a waveform shaping circuit 53. The output signals of the input section 50e are respectively supplied to the CPU 50a. On the other hand, the CPU 50a outputs control signals through the output section 50f and a drive circuit 54 to piezo-actuators 11FL, 11FR, 11RL and 11RR.

Figure 14:
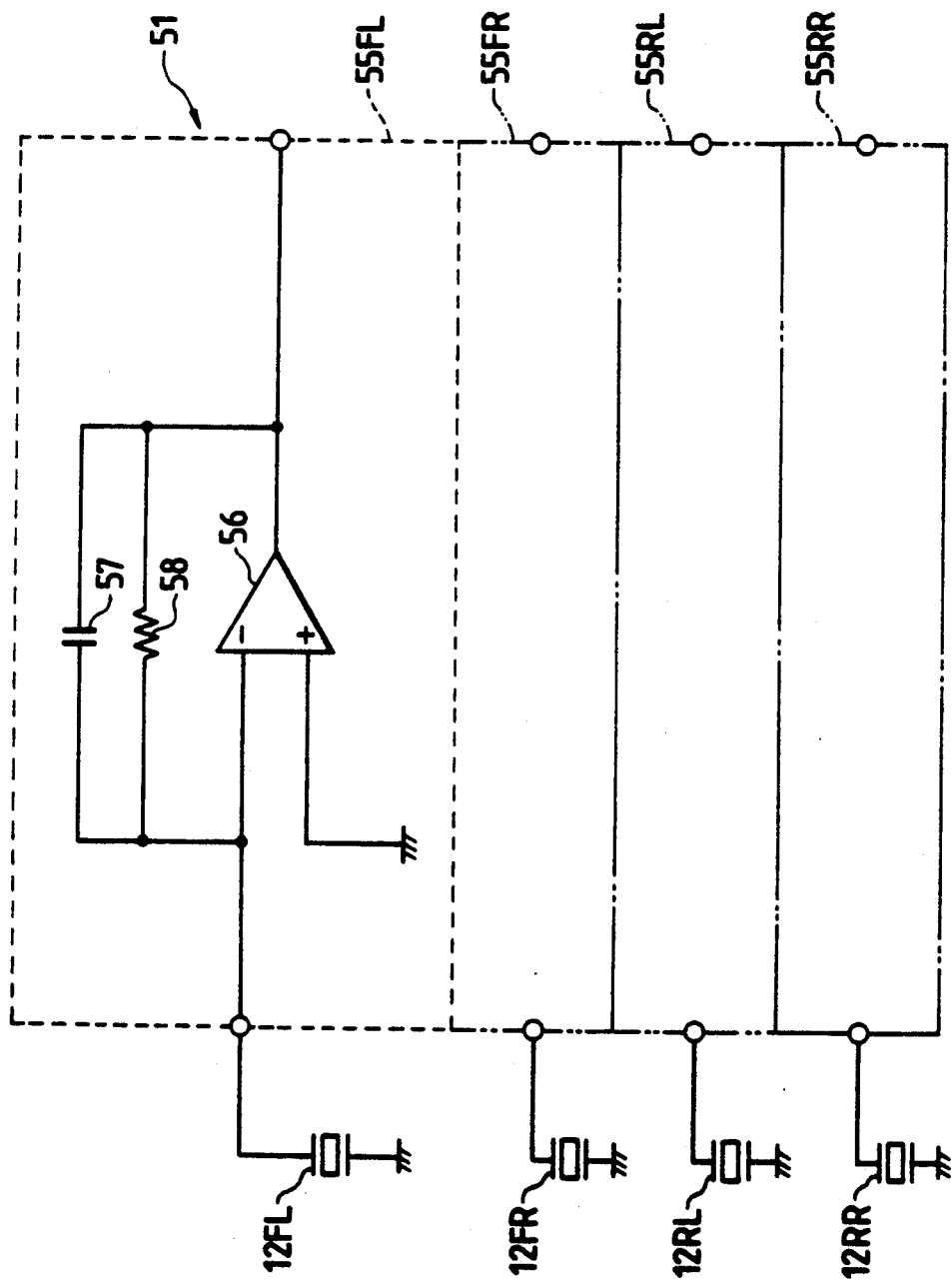
FIG. 14 is an illustration of a charge amplifying circuit used i FIG. 13 electronic control unit;
a shock

The arrangement of the charge amplifying circuit 51 will be described hereinbelow with reference to FIG. 14. In FIG. 14, the charge amplifying circuit 51 is composed of four condensing circuits 55FL, 55FR, 55RL and 55RR provided in correspondance with the respective piezo-type damping force sensors 12FL, 12FR, 12RL and 12RR. All the condensing circuits 55FL, 55FR, 55RL and 55RR have the same structure and therefore the description thereof will be made in terms of only the consensing circuit 55FL.

The consensing circuit 55FL is composed of an integrating circuit comprising an operational amplifier 56 and a capacitor 57 and a resistor 58 coupled in parallel to the integrating circuit. When the charge generated in the piezo-type damping force sensor 12FL is inputted in the condensing circuit 55FL, the charge is stored in the capacitor 57 by the aid of the operational amplifier 56. The charge stored in the capacitor 57 is supplied as a damping force signal to the differentiating circuit 52 and further to the input section 50e. The differentiating circuit 52 has an arrangement including a well known operational amplifier so as to receive the damping force signal and supply the input section 50e with a differentiated signal which is the time differential value of the damping force signal.

Figure 15:
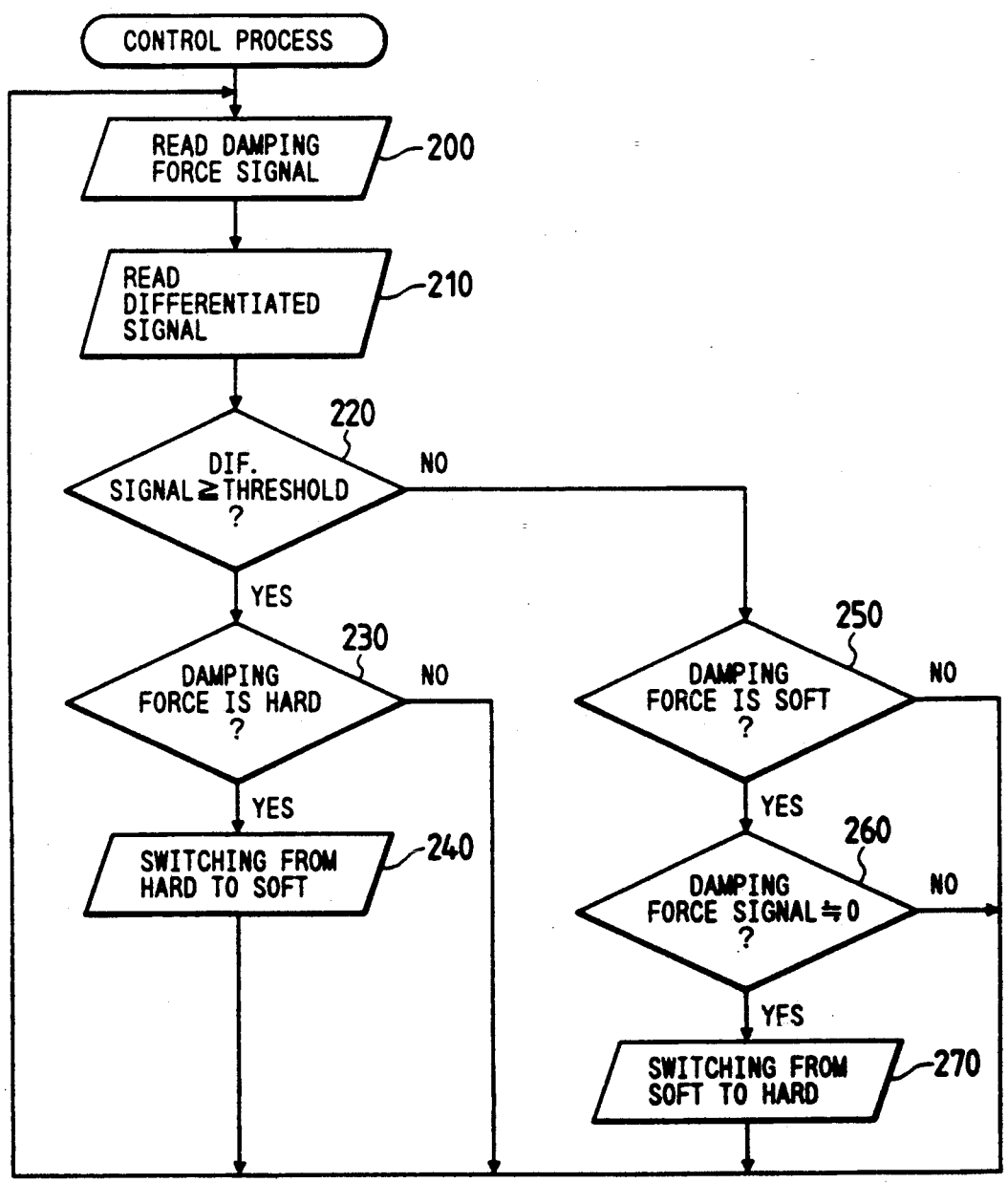
FIG. 15 is a flow chart for describing absorber control process executed by the FIG. 13 electronic control unit.

The shock absorber control process executed in the ECU 50 will be described hereinbelow with reference to the flow chart of FIG. 15. The shock absorber control process will be started in response to the start of the ECU 50.

Control starts with a step 200 to read the damping force signal, followed by a step 210 to read the differentiated signal. Control then goes to a step 220 to check whether the absolute value of the differentiated signal read in the previous step 210 exceeds a predetermined threshold value. If the answer of the step 220 is affirmative, control goes to a step 230, and if the answer is negative, control goes to a step 250. In the step 230, it is checked whether the present damping force is the high damping force (HARD). If so, the step 230 is followed by a step 240, and if not, the operational flow returns to the step 200. The step 240 is provided to output control signals to the piezo-actuators 11FL, 11FR, 11RL and 11RR so as to switch the damping force from the high damping force (HARD) to the low damping force (SOFT). Thereafter, the operational flow returns to the step 200.

On the other hand, when in the step 220 the determination is made such that the absolute value of the differentiated signal is below the predetermined threshold value, control goes to the step 250 to check whether the present damping force is the low damping force (SOFT). If the answer of the step 250 is affirmative, control advances to a step 260, and if negative, the operational flow returns to the step 200. The step 260 is provided in order to check whether the damping force signal read in the step 200 is substantially zero. If so, control goes to a step 270, and if not, the operational flow returns to the step 200. In the step 270, control signals for switching the damping force from the low damping force (SOFT) to the high damping force (HARD) are outputted to the piezo-actuators 11FL, 11FR, 11RL and 11RR. After execution of the step 270, the operational flow returns to the step 200. Thereafter, the aforementioned processes of the steps 200 to 270 are executed repeatedly.

According to this embodiment of the shock absorber control system, even in the case of generation of shock vibration of the motor vehicle when the vehicle goes over a projection of the running road surface, the damping force can be switched from the high damping force to the low damping force at the timing that is appropriate to absorb the shock and further switched from the low damping force to the high damping force at the timing that is suitable to control the vibration due to the shock. That is, as shown in the timing chart of FIG. 16, in the case that a wheel of the vehicle gets over a projection 59 when the vehicle is running in the direction indicated by an arrow C, at the time T3 that the wheel starts to get over the projection 59, since the differentiated signal exceeds the positive threshold value +Vref, the damping force is changed at the time T3 from the high damping force (HARD) to the low damping force (SOFT). Thus, the shock occuring when the wheel starts to get over the projection 59 can be softened. The after, in response to the wheel getting over the projection 59, the differentiated signal becomes between the positive threshold +Vref and the negative threshold −Vref. At the time T4 that the damping force signal becomes zero, the damping force is changed from the low damping force (SOFT) to the high damping force (HARD). Thus, the aftershock of the vibration generated due to the getting-over of the projection 59 can be restricted so as to result in speeding of the convergence of the vibration, thereby improving the comfort of the ride of the motor vehicle and further improving the stability and handling performance thereof.

Furthermore, a description will be made hereinbelow in terms of a third embodiment of a shock absorber control system according to the present invention with reference to FIG. 17.

Figure 17:
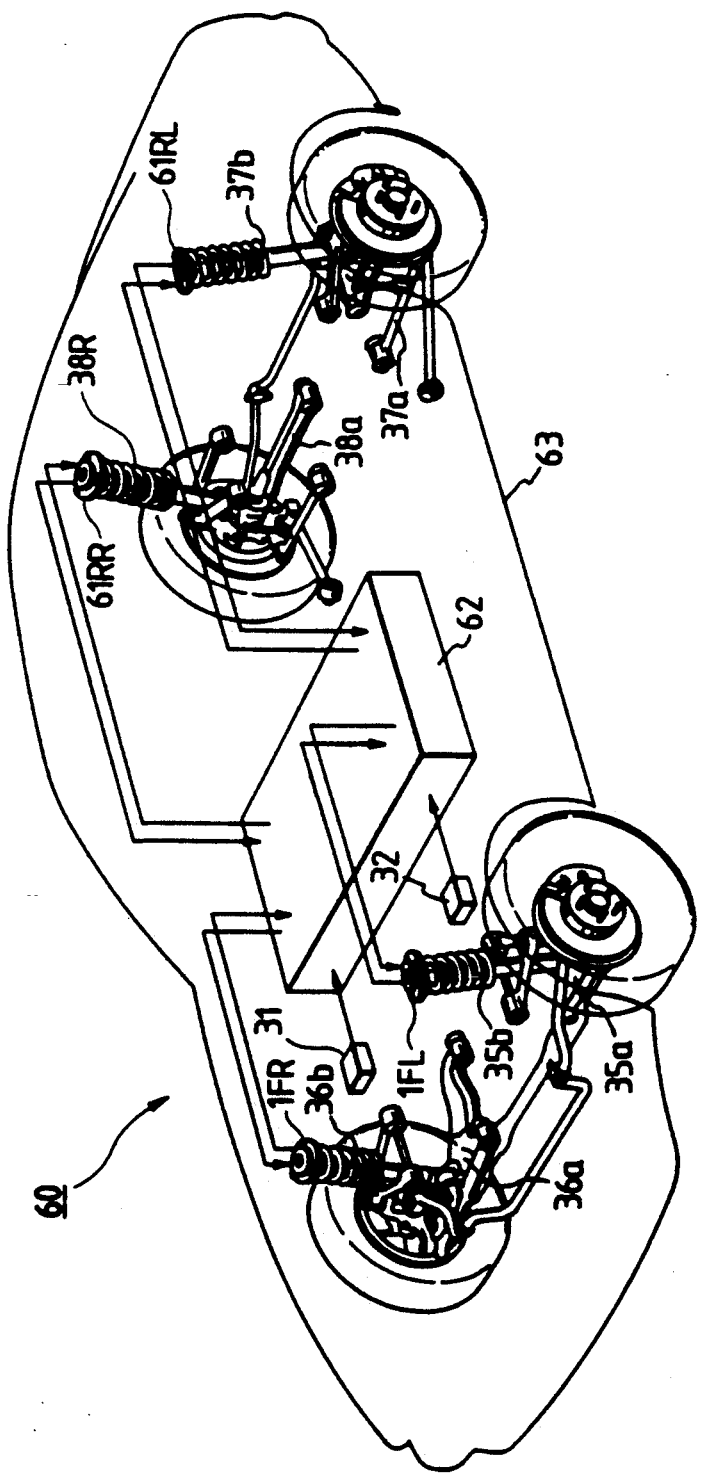
FIG. 17 shows a shock absorber control system according to a further embodiment of this invention.
Figure 18:
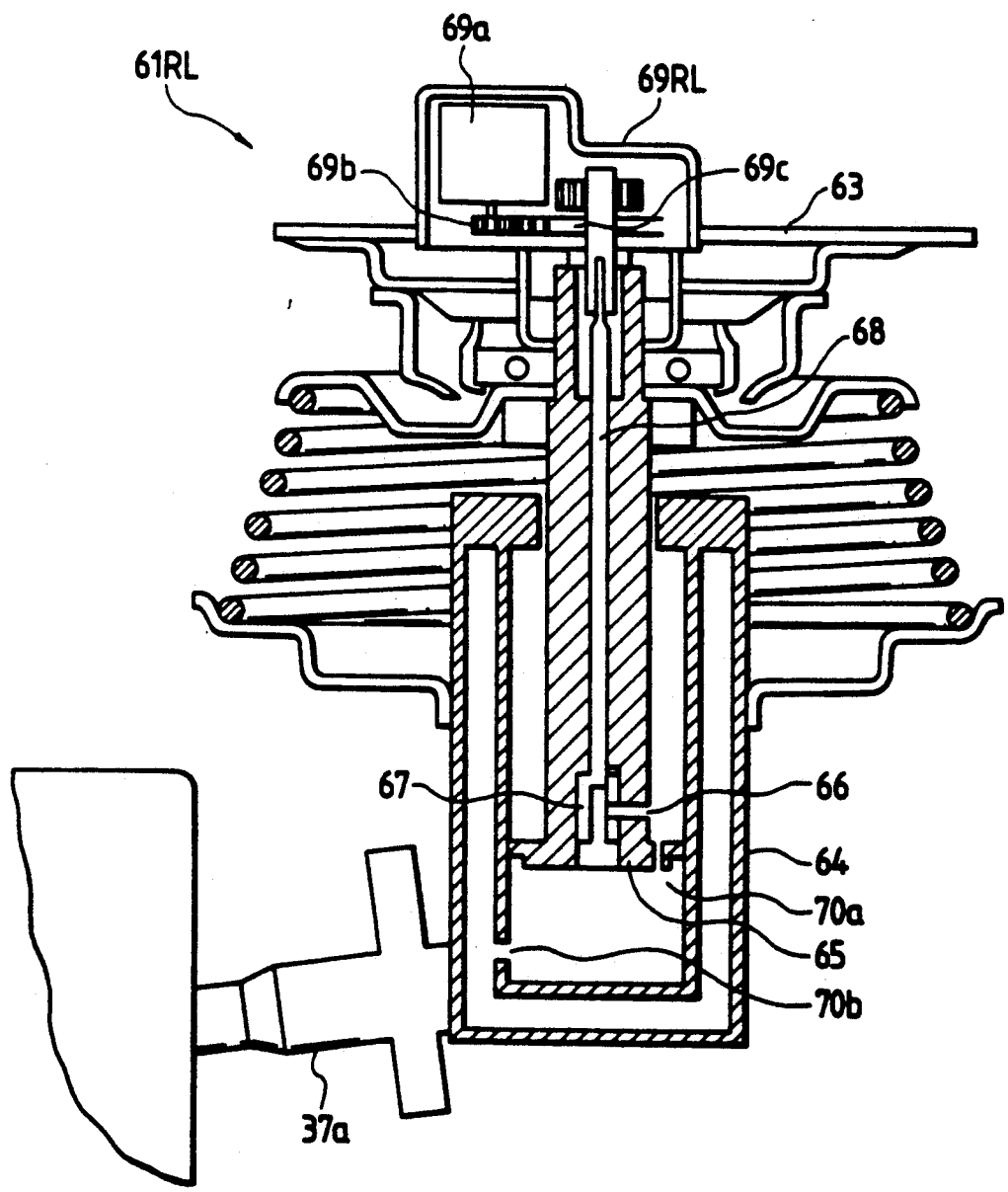
FIG. 18 is a cross-sectional view showing a variable damping force shock absorber.
Figure 20A:
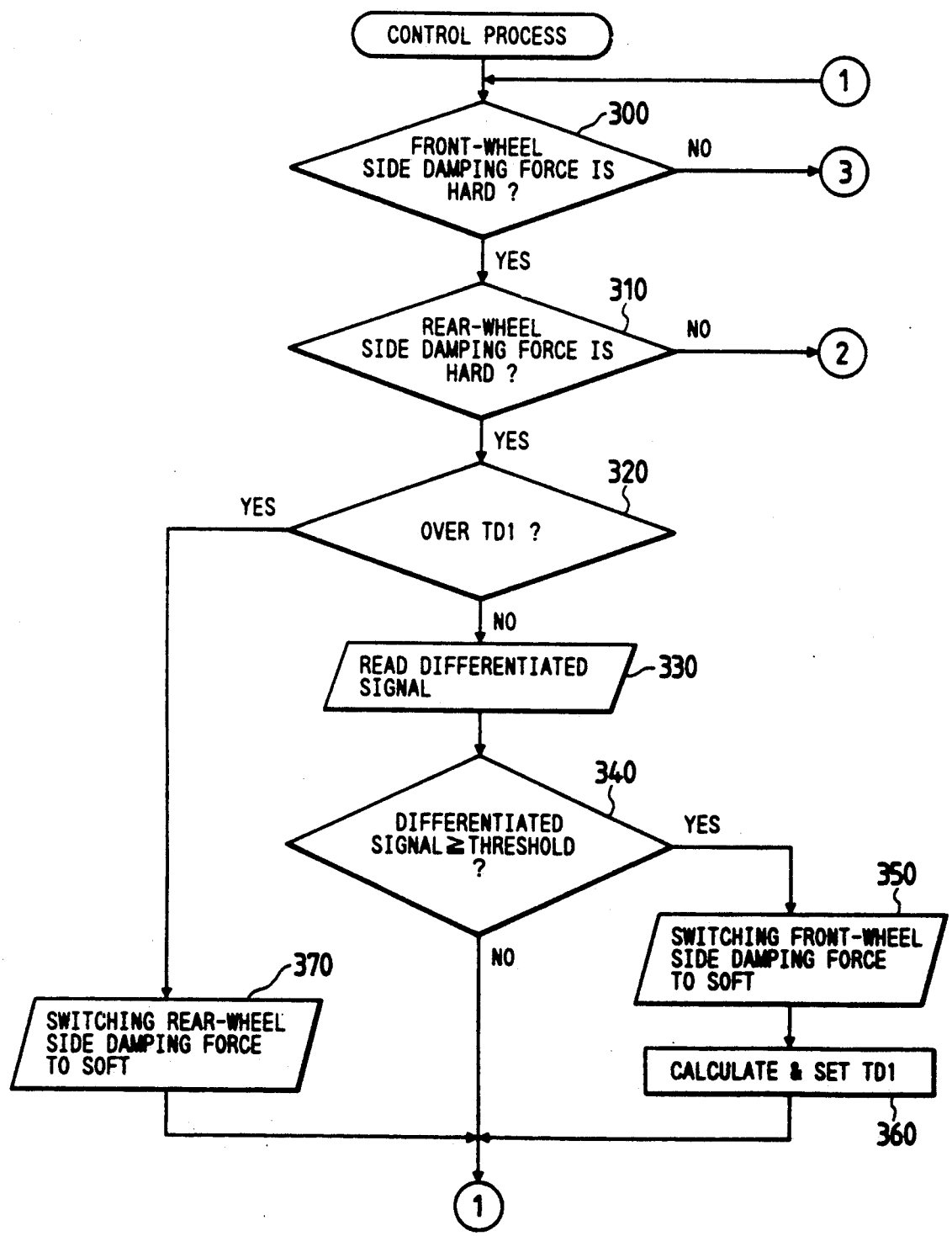
Figure 20B:
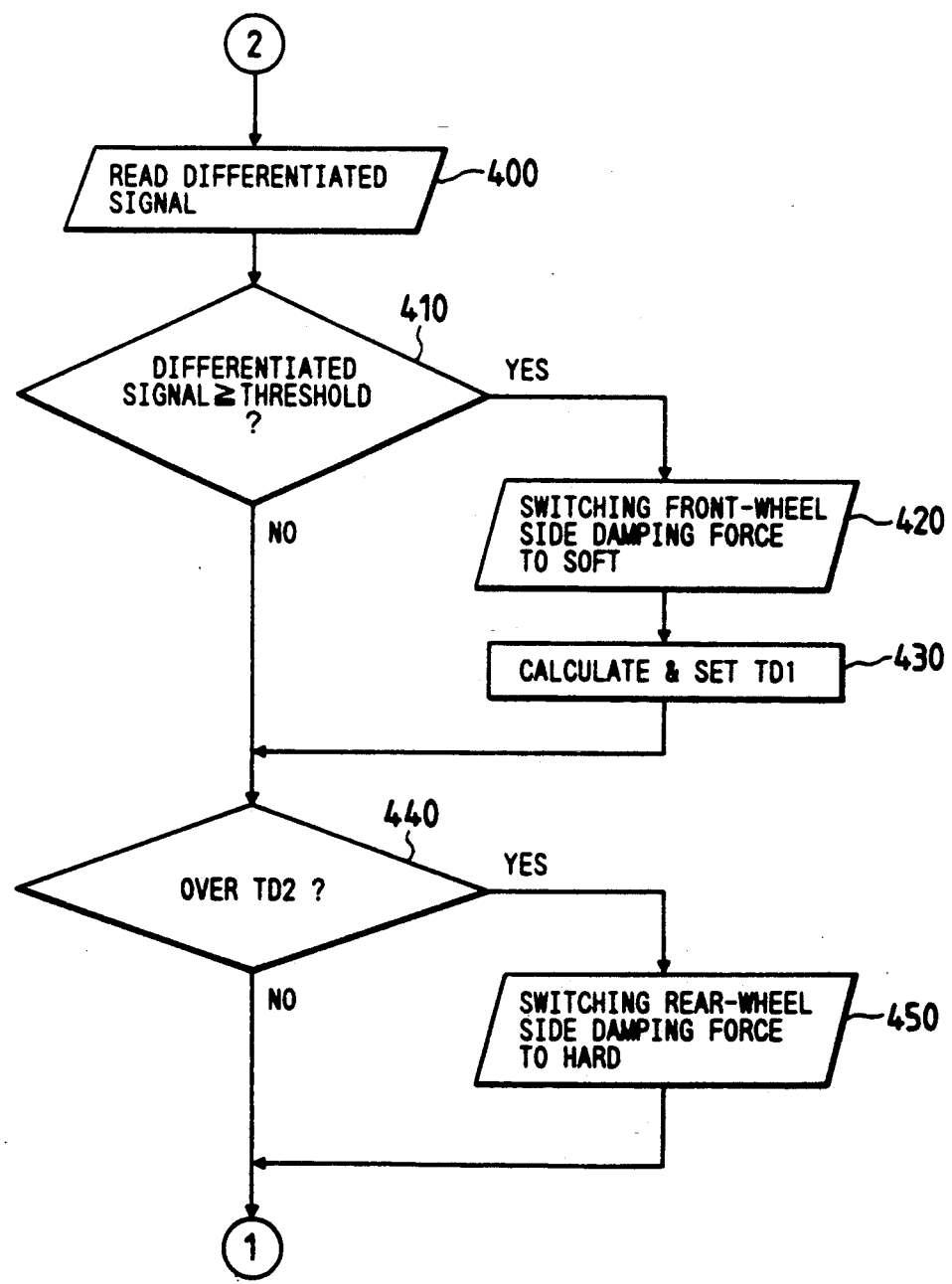
Figure 20D:
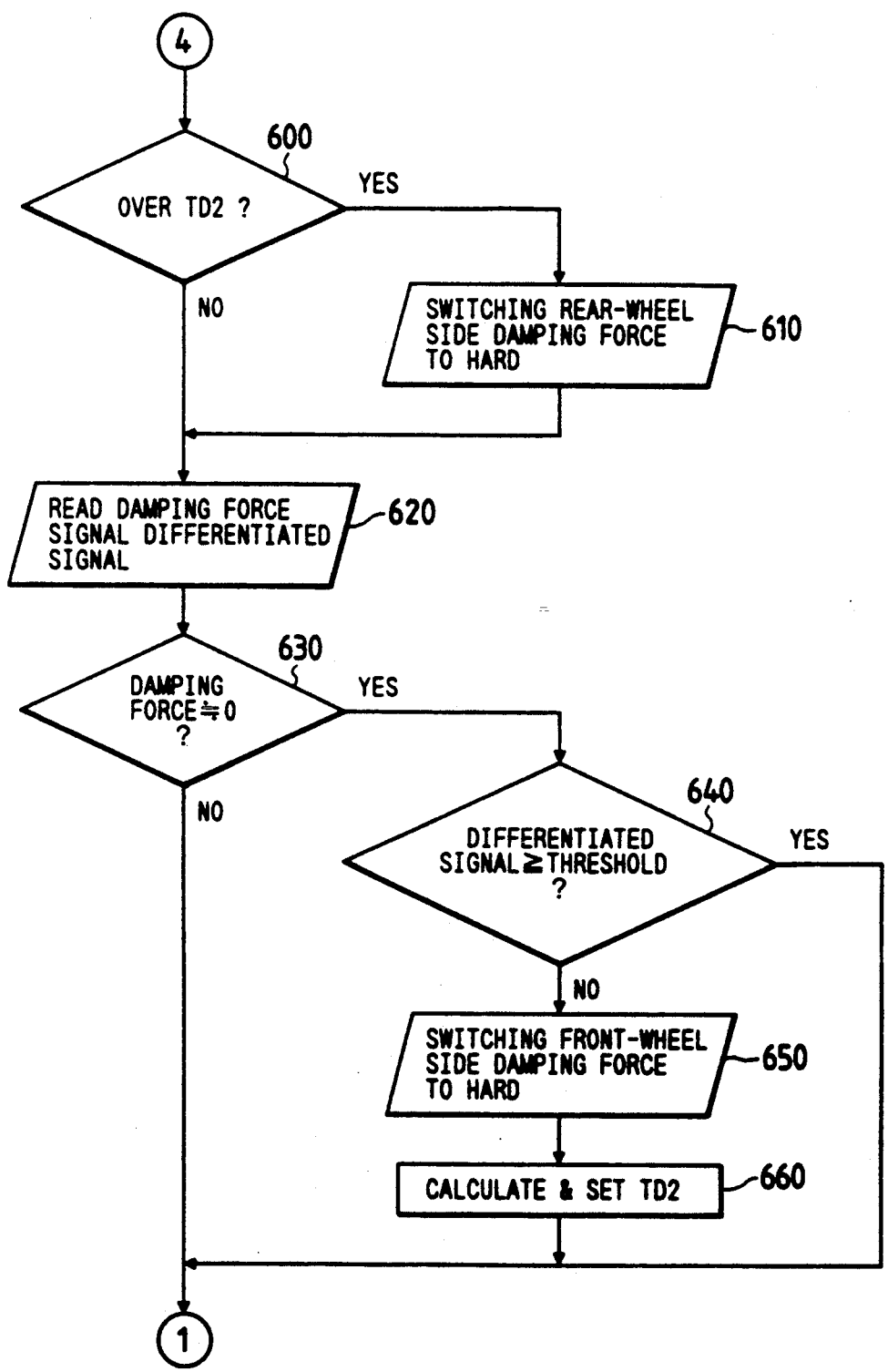

In FIG. 17, the shock absorber control system illustrated at numeral 60 comprises variable damping force type shock absorbers 1FL, 1FR, 61RL and 61RR, a stop lamp switch 31 for detecting the brake-operating state of the motor vehicle, a vehicle speed sensor 32 for detecting the speed of the motor vehicle, and an electronic control unit (ECU) 62. The variable damping force type shock absorbers 1FL, 1FR, 61RL and 61RR, together with coil springs 35b, 36b, 37b, 38b, are respectively disposed between a vehicle body 63 and suspension lower arms 35a, 36a, 37a, 38a. Each of the front-wheel side variable damping force type shock absorbers 1FL and 1FR, as described above, has therein a piezo-type damping force sensor for detecting the damping force applied thereto and a piezo-actuator for switching the damping force thereof. On the other hand, each of the rear wheel side variable damping force type shock absorbers 61RL and 61RR has a structure different from the structure of the front wheel side variable damping force type shock absorbers 1FL and 1FR, and a description will be made hereinbelow in terms of the shock absorber 61RL with reference to FIG. 18. As illustrated in FIG. 18, the shock absorber 61RL is disposed between the body 63 and the suspension lower arm 37a, and comprises a cylinder 64 connected to the lower arm 37a, a piston 65 slidably coupled to the cylinder 64, a rotary valve 67 provided in the piston 65 for adjusting the opening degree of a variable orifice 66, a control rod 68 for actuating the rotary valve 67, and a motor actuator 69RL for rotating the control rod 68. The motor acutator 69RL is equipped with a motor 69a, a pinion gear 69b, and a sector gear 69c, the motor 69a being operated to be rotated in response to a control signal from the ECU 62 and the rotating force thereof being successively transferred to the other devices. The cylinder 64 is provided with fixed orifices 70a and 70b. In the shock absorber 61RL having the aforementioned arrangement, in accordance with the control signal from the ECU 62, the motor actuator 69RL causes rotation of the control rod 68 whereby the rotary valve 67 is switched to take the communicating state or the shutoff state so as to switch the damping force of the shock absorber 61RL between the high damping force and the low damping force.

The arrangement of the ECU 62 will be described hereinbelow with reference to FIG. 19. In FIG. 19, the ECU 62 is constructed as a logical operation circuit basically comprising a CPU 62a, a ROM 62b and a RAM 62c which are in turn coupled through a common bus 62d to an input section 62e and an output section 62f. The detection signals of the piezo-type damping force sensors 12FL and 12FR provided in only the front wheel side shock absorbers 1FL and 1FR are inputted to a charge amplifying circuit 71 so as to obtain damping force signals, which are directly supplied to the input section 62e and further supplied thereto through a differentiating circuit 72. Further, the detection signals of a stop lamp switch 31 and a vehicle speed sensor 32 are supplied through a waveform shaping circuit 73 to the input section 62e. In response to these input signals, the CPU 62a outputs control signals through the output section 62f and a drive circuit 74 to the piezo-actuators 11FL, 11FR, and further outputs control signals through the output section 62f and a drive circuit 75 to the motor actuators 69RL and 69RR provided in the rear wheel side ahock absorbers 61RL and 61RR.

A description will be made hereinbelow in terms of the shock absorber control process, executed by the ECU 62, with reference to flow charts of FIGS. 20A to 20D. This shock absorber process starts in response to the start of the ECU 62.

The control process starts with a step 300 in order to check whether the present front-wheel side damping force assumes the high damping force (HARD). If the answer of the step 300 is affirmative, control goes to a step 310. If the answer is negative, control goes to a step 500. In the step 310, it is checked whether the damping force of the rear wheel side shock absorber 61RL and 61RR is the high damping force (HARD). If so, control goes to a step 320, and if not, control goes to a step 400. The step 320 is provided to check whether time elapses a delay time TD1. If so, the step 320 is followed by a step 370. If not, it is followed by a step 330 so as to read the differentiating signal. A subsequent step 340 is then executed in order to check whether the absolute value of the differentiating signal read in the previous step 330 exceeds a predetermined threshold value. If the answer of the step 340 is affirmative, control advances to a step 350, and if negative, the operational flow returns to the initial step 300. In the step 350, control signals for switching the front-wheel side damping force from the high damping force (HARD) to the low damping force (SOFT) are supplied to the piezo-actuators 11FL and 11FR. Thereafter, a step 360 follows to calculate and set the delay time TD1, and the operational flow returns to the step 300. Here, the delay time TD1 may be obtained by dividing the wheel base by the vehicle speed. That is, the delay time TD1 means the time corresponding to the time period between the time that the front wheel runs on a projection, i.e., obstacle, and the time that the rear wheel runs on the same projection.

On the other hand, in the step 370 executed when exceeding the delay time TD1, control signals for switching the rear-wheel side damping force from the high damping force (HARD) to the low damping force (SOFT) are outputted to the motor actuators 69RL and 69RR, then followed by the initial step 300. Furthermore, when in the step 310 the decision is made such that the present rear-wheel side damping force is not the high damping force (HARD), the step 400 is executed in order to read the differentiating signal. A subsequent step 410 is executed to check whether the absolute value of the differentiating signal read in the step 400 exceeds a predetermined threshold value. If exceeding the predetermined threshold value, control advances to a step 420, and if not, control goes to a step 440. In the step 420, control signals for switching the front-wheel side damping force from the high damping force (HARD) to the low damping force (SOFT) are supplied to the piezo-actuators 11FL and 11FR. The step 420 is followed by a step 430 to calculate and set the delay time TD1, then followed by a step 440. The step 440 is provided to check whether the time exceeds a holding time TD2. If so, control goes to a step 450, and if not, control returns to the step 300. Here, the holding time TD2 is the time period that the rear-wheel side damping force is held to be the low damping force (SOFT). The holding time TD2 is determined on the basis of the time tl, that the front-wheel side damping force is maintained to be the low damping force, in accordance with a map which shows the relation the holding time TD2 and a predetermined function f(tl) or the aforementioned time tl. That is, the holding time TD2 corresponds to the time for keeping the rear-wheel side damping force to be the low damping force when the rear wheel runs on an obstacle on which the front wheel runs.

In the step 450, control signals for switching the rear-wheel side damping force from the low damping force (SOFT) to the high damping force (HARD) are supplied to the motor actuators 69RL and 69RR. Thereafter, the operational flow returns to the initial step 300.

On the other hand, when the decision of the step 300 is "NO", the step 500 is executed so as to check whether the present rear-wheel side damping force assumes the high damping force (HARD). If the answer of the step 500 is affirmative, control advances to a step 510, and if not, control goes to a step 600. In the step 510, it is checked whether the time exceeds the delay time TD1. If the answer of the step 510 is affirmative, control goes to a step 570, and if negative, the control goes to a step 520. The step 520 is executed to read the damping force signal and the differntiated signal. The step 520 is followed by a step 530 to check, on the basis of the damping force signal read in the previous step 520, whether the front-wheel side damping force is substantially zero during transferring from the expansion to the contraction. If so, control goes to a step 540, and if not, the operational flow retuns to the step 300. The step 540 is executed to check whether the absolute value of the differentiated signal read in the step 520 is above a predetermined theshold value. If so, the operational flow returns to the step 300, and if not, control goes to a step 550. In the step 550, control signals for switching the front-wheel side damping force from the low damping force (SOFT) to the high damping force (HARD) are outputted to the piezo-actuators 11FL and 11FR. A step 560 follows to calculate and set the holding time TD2. Thereafter, the operational flow returns to the step 300.

On the other hand, in the step 570 which is executed when the time exceeds the delay time TD1, control signals for switching the rear-wheel side damping force from the high damping force (HARD) to the low damping force (SOFT) are supplied to the motor actuators 69RL and 69RR. Thereafter, the operational flow returns to the step 300. Furthermore, when in the step 500 the decision is made such that the rear-wheel side damping force is not the high damping force (HARD), the step 600 is executed so as to check whether the time exceeds the holding time TD2. If the answer of the step 600 is affirmative, control goes to a step 610, and if negative, the control goes to a step 620. In the step 610, control signals for switching the rear-wheel side damping force from the low damping force (SOFT) to the high damping force (HARD) are outputted to the motor actuators 69RL and 69RR. After execution of the step 610, control goes to the step 620 to read the damping force signal and differentiated signal, then followed by a step 630 to check, on the basis of the damping force signal read in the previous step 620, whether the front-wheel side damping force is substantially zero during transferring from the expansion to the contraction. If so, control goes to a step 640, and if not, the operational flow returns to the step 300. The step 640 is executed to check whether the absolute value of the differentiated signal read in the step 620 is equal to or greater than a predetermined threshold value. If so, the operational flow returns to the step 300, and if not, control advances to a step 650. In the step 650, control signals for switching the front-wheel side damping force from the low damping force (SOFT) to the high damping force (HARD) are outputted to the piezo-actuators 11FL and 11FR. A step 660 follows to calculate and set the holding time TD2. Thereafter, the operational flow returns to the step 300 to execute the above-mentioned steps 300 to 660 repeatedly.

As described above, according to this embodiment, at the front-wheel side are provided variable damping force type shock absorbers 1FL and 1FR which respectively have therein the piezo-type damping force sensors 12FL, 12FR and the piezo-actuators 11FL, 11FR, and at the rear-wheel side are disposed variable damping force type shock absorbers 61RL and 61RR which do not have damping force detection functions and which respectively have therein only the motor actuators 69RL, 69RR. Thus, at the front-wheel side, the damping force can be detected with a high level of accuracy and changed with a high response, and at the rear-wheel side, the damping force is changed after elapse of the delay time TD1 obtained by dividing the wheel base by the vehicle speed and the rear-wheel side damping force is kept to be the low damping force for the holding time TD2 calculated on the basis of the continuation time of the front-wheel side low damping force. That is, the variable damping force type shock absorbers 1FL and 1FR are provided at only the front-wheel side which requires the high-accuracy damping force detection function and the high-response damping force switching function, and the general variable damping force type shock absorbers 61RL and 61RR are provided at the rear-wheel side. This can provide, with a simple structure, an effect similar to the above-described other embodiments. In addition, since the number of the signals inputted to the ECU 62 can be reduced and the rear-wheel side control becomes relatively easy, the shock absorber control process results in being simple.

It should be understood that the foregoing relates to only preferred embodiments of the invention, and that it is intended to cover all changes and modifications of the embodiments of the invention herein used for the purposes of the disclosure, which do not constitute departures from the spirit and scope of the invention.

What is claimed is:

1. An apparatus for detecting the magnitude of a damping force applied to a shock absorber having a cylinder and a piston slidably inserted therein, said piston having a cylindrical piston rod affixed thereto, the damping force being detected occurring in a direction opposite to a direction of motion of said piston relative to said cylinder, said apparatus comprising:

piezoelectric means for generating a signal corresponding to a pressure applied thereto, said piezoelectric means having a diameter smaller than a diameter of said piston rod and being disposed in a hollowed region thereof; and pressurizing means, coupled with said piston rod and contacting said piezoelectric means, for applying said pressure thereto in correspondence with a distortion of said piston rod caused by the damping force, wherein said pressurizing means comprises a convex member having at its one end portion a convexshaped surface, and a concave member having at its one end portion a concave-shaped surface, said concave and convex members being arranged such that said convex-shaped and concave-shaped surfaces are connected.

* * * * *